(12) United States Patent
Nam et al.

(10) Patent No.: US 10,535,438 B2
(45) Date of Patent: Jan. 14, 2020

(54) DIGITAL PROTECTION SYSTEM FOR NUCLEAR POWER PLANT

(71) Applicant: DOOSAN HEAVY INDUSTRIES & CONSTRUCTION CO., LTD., Changwon (KR)

(72) Inventors: Chaeho Nam, Yongin-si (KR); Sanghoon Lee, Yongin-si (KR); Choonyong Lee, Yongin-si (KR)

(73) Assignee: Doosan Heavy Industries Construction Co., Ltd, Gyeongsangnam-do (KR)

(*) Notice: Subject to any disclaimer, the term of this patent is extended or adjusted under 35 U.S.C. 154(b) by 335 days.

(21) Appl. No.: 15/646,611

(22) Filed: Jul. 11, 2017

(65) Prior Publication Data

US 2018/0122524 A1 May 3, 2018

(30) Foreign Application Priority Data

Nov. 3, 2016 (KR) .......................... 10-2016-0145468
May 15, 2017 (KR) .......................... 10-2017-0060134

(51) Int. Cl.
*G21D 3/00* (2006.01)
*G21D 3/06* (2006.01)
*G21C 9/02* (2006.01)

(52) U.S. Cl.
CPC .............. *G21D 3/001* (2013.01); *G21D 3/06* (2013.01); *G21C 9/02* (2013.01)

(58) Field of Classification Search
CPC . G21D 3/06; G21D 3/001; G21D 5/08; G05B 19/058; G05B 19/0428;
(Continued)

(56) References Cited

U.S. PATENT DOCUMENTS 6,292,523 B1 * 9/2001 Senechal .................. G05B 9/03
376/259
6,484,126 B1 * 11/2002 Brown, Sr. .............. G05B 9/03
702/184
(Continued)

FOREIGN PATENT DOCUMENTS

KR    1020010013440 A    2/2001
KR      20080051417 A  *  6/2008
(Continued)

OTHER PUBLICATIONS

Communication dated Dec. 19, 2017, from Korean Intellectual Property Office in counterpart application No. 10-2016-0145468.
(Continued)

*Primary Examiner* — Lily C Garner
(74) *Attorney, Agent, or Firm* — Invenstone Patent, LLC

(57) ABSTRACT

A digital protection system is provided. The digital protection system may include: a process protection system including at least two channels, each channel including a first bistable logic controller and a second bistable logic controller which are independent and different from each other, the first bistable logic controller and the second bistable logic controller outputting bistable logic results; a reactor protection system including at least two trains, each train including a first coincidence logic controller and a second coincidence logic controller which are independent and different from each other, the first coincidence logic controller and the second coincidence logic controller outputting coincidence logic results by receiving the bistable logic results from the process protection system; and an initiation circuit normally operating or stopping a reactor according to the coincidence logic results received from the reactor protection system.

19 Claims, 19 Drawing Sheets

(58) Field of Classification Search
CPC ........... G05B 2219/14006; G05B 2219/14124; G05B 9/03; G21C 7/36; G21C 9/02
See application file for complete search history.

(56) References Cited

U.S. PATENT DOCUMENTS

2004/0136487 A1* 7/2004 Shin .................. G21D 3/04
376/259
2018/0330837 A1* 11/2018 Lee .................. G21D 3/06

FOREIGN PATENT DOCUMENTS

| KR | 1020080051417 A | | 6/2008 |
|---|---|---|---|
| KR | 101042030 B1 | * | 6/2011 |
| KR | 10-1199625 B1 | | 11/2012 |
| KR | 10-2016-0086082 A | | 7/2016 |
| KR | 20160086082 A | * | 7/2016 |
| KR | 101846345 B1 | * | 4/2018 |

OTHER PUBLICATIONS

A Korean Office Action dated Dec. 19, 2018 in connection with Korean Patent Application No. 10-2017-0060134 which corresponds to the above-referenced U.S. application.

* cited by examiner

PRIOR ART

DIGITAL PROTECTION SYSTEM FOR NUCLEAR POWER PLANT

CROSS REFERENCE TO RELATED APPLICATIONS

The present application claims priority to Korean Patent Application No. 10-2016-0145468, filed Nov. 3, 2016, and Korean Patent Application No. 10-2017-0060134, filed on May 15, 2017, the disclosures of which are incorporated herein by reference in their entireties.

BACKGROUND

Field

Apparatuses and methods consistent with exemplary embodiments relate to improving safety (improving stopping function of a reactor) of a protection system for a nuclear power plant, and more specifically, to improving a stopping function of a reactor of the protection system in which duplexed controllers independent from each other are disposed, and operation processing results of the duplexed controllers are combined in a particular manner. Thus, single point vulnerability (SPV) of the protection system is removed, and response to a common cause failure (CCF) may be provided.

Description of the Related Art

Nuclear power plants refer to power plants that generate electricity by turning a turbine generator with steam that is generated by boiling water with energy generated through a nuclear fission chain reaction. In an atomic nucleus composed of protons and neutrons, enormous energy is released when the nucleus is divided into free particles. Nuclear power plants using the above feature correspond to an optimal power source capable of obtaining significant energy even with very small amounts of fuel. In many countries, nuclear power plants are used to produce electricity.

However, in nuclear power plants, since the use of nuclear power is accompanied by a very high risk, it is necessary to control many safety devices and hire experts having advanced training.

Protection systems perform functions of monitoring a state of a nuclear steam supply system (NSSS), stopping a nuclear reactor when monitored process parameters reach safety system preset values, and mitigating the effects of accidents.

SPV refers to shutdown inducing elements of a nuclear reactor or a turbine due to a failure of a single device. Conventionally, places in which a number of SPVs occurs may exist within currently operating nuclear power plants. From among these, the number of SPVs of a reactor protection system of operating nuclear power plants built in the 1980s is about 70 to 90. These SPVs are caused by various analog equipment of the reactor protection system which is not multiplexed.

CCFs refer to a situation where simultaneous failures occur in various devices due to a common cause. When a CCF occurs in the protection system, it may seriously affect the protection system's performance of safety functions.

A representative example to easily understand CCF is Y2K (Millennium Bug) which was problematic in 1999. This refers to a phenomenon where it was determined that a computer may not recognize the year 2000 and thus may malfunction when that time occurs. However, in case of this problem, the cause of the problem was eliminated in advance through advance preparation, and only some errors occurred in some fields.

SUMMARY

Exemplary embodiments address at least the above problems and/or disadvantages and other disadvantages not described above. Also, the exemplary embodiments are not required to overcome the disadvantages described above, and may not overcome any of the problems described above.

One or more exemplary embodiments provide solutions to the SPV and CCF problems occurring in the conventional nuclear power plant protection system. According to the exemplary embodiments, a digital protection system for a nuclear power plant is provided. The digital protection system may include a process protection system and a reactor protection system which are configured with coincidence logic controllers and bistable logic controllers that are different from each other.

According to an aspect of an exemplary embodiment, there is provided a digital protection system including: a process protection system including at least two channels, each of the at least two channels including a first bistable logic controller and a second bistable logic controller which is independent and different from the first bistable logic controller, the first bistable logic controller and the second bistable logic controller receiving a process parameter and outputting bistable logic results based on the process parameter; and a reactor protection system including at least two trains, at least two initiation circuits, and a parallel circuit. Each of the two trains may include a first coincidence logic controller and a second coincidence logic controller which is independent and different from the first coincidence logic controller, the first coincidence logic controller and the second coincidence logic controller outputting coincidence logic results based on the bistable logic results. Each of the at least two initiation circuits may include a serial circuit in which a plurality of relays are serially connected. The parallel circuit may include a plurality of relays which are connected in parallel. The plurality of relays included in the serial circuit may be switched on or off based on the bistable logic results received from the first and second bistable logic controllers that are different from each other. The plurality of relays included in the parallel circuit may be switched on or off based on the coincidence logic results received from the first and second coincidence logic controllers different from each other.

The process protection system may include a first channel, a second channel, a third channel, and a fourth channel.

The reactor protection system may include a first train and a second train.

The process protection system may include a first bistable logic controller based on a field programmable gate array (FPGA), and may include a second bistable logic controller based on a programmable logic controller (PLC).

Each of the first and the second bistable logic controllers may transmit the bistable logic results to all coincidence logic controllers that have a same type of a logic structure.

The process parameter may include at least one of temperature information about a high temperature pipe and a low temperature pipe of a reactor coolant, pressurizer pressure information, pressurizer water level information, neutron flux information, reactor coolant flow rate information, containment building pressure information, steam generator water level information, steam pipe pressure information, and refueling water tank water level information.

The bistable logic results may include a first bistable logic result and a second bistable logic result, and the coincidence logic results may include a first coincidence logic result and a second coincidence logic result. The first coincidence logic controller may receive the first bistable logic result including a first normal signal or a first abnormal signal from the first bistable logic controller included in each of the channels, and may output the first coincidence logic result based on a number of the first bistable logic result and a number of the first abnormal signal. The first coincidence logic result may include a first output signal and a second output signal that is different from the first output signal. The first output signal may be input to a first relay of the plurality of relays included in the serial circuit. The second output signal may be input to a first relay of the plurality of relays included in the parallel circuit. The second coincidence logic controller may receive the second bistable logic result including a second normal signal or a second abnormal signal from the second bistable logic controller included in each of the channels, and may output the second coincidence logic result based on a number of the second bistable logic result and a number of the second abnormal signals. The second coincidence logic result may include a third output signal and a fourth output signal that is different from the third output signal, the third output signal may be input to a second relay of the plurality of relays included in the serial circuit, and the fourth output signal may be input to a second relay of the plurality of relays included in the parallel circuit.

The first coincidence logic controller may output the first coincidence logic result in response to the first bistable logic result including at least one abnormal signal. An output signal being 0 of the first coincidence logic result may be input to the first relay of the plurality of relays included in the serial circuit, and an output signal being 1 of the first coincidence logic result may be input to the first relay of the plurality of relays included in the parallel circuit. The second coincidence logic controller may output a second coincidence logic result in response to the second bistable logic result including at least one abnormal signal, an output signal being 0 of the second coincidence logic result may be input to the second relay of the plurality of relays included in the serial circuit, and an output signal being 1 of the second coincidence logic result may be input to the second relay of the plurality of relays included in the parallel circuit.

The first coincidence logic controller may output a coincidence logic result in response to the bistable logic results including at least one normal signal. An output signal being 1 of the coincidence logic result may be input to a first relay of the plurality of relays included in the serial circuit, and an output signal being 0 of the coincidence logic result may be input to a first relay of the plurality of relays included in the parallel circuit. The second coincidence logic controller may output a coincidence logic result in response to the bistable logic results including at least one normal signal, wherein an output signal being 1 of the coincidence logic result may be input to a second relay of the plurality of relays included in the serial circuit, and an output signal being 0 of the coincidence logic result may be input to a second relay of the plurality of relays included in the parallel circuit.

The digital protection system may further include an reactor trip switchgear system (RTSS), wherein the RTSS may include: a first normally open (NO) contact point disposed between a power node and a central node; a second NO contact point disposed between the power node and the central node; a third NO contact point disposed between the central node and a control element drive mechanism (CEDM); and a fourth NO contact point disposed between the central node and the CEDM.

When at least one of the first NO contact point and the second NO contact point is in a closed state and at least one of the third NO contact point and the fourth NO contact point is in a closed state, motor-generator set (MG-SET) power may be applied to the CEDM.

When both of the first NO contact point and the second NO contact point are in opened states and both of the third NO contact point and the fourth NO contact point are in opened states, MG-SET power applied to the CEDM may be shut down.

At least one of the initiation circuits may include: a first serial circuit configured to control a conduction state of the first NO contact point according to output signals of the coincidence logic controller; a first parallel circuit configured to control a conduction state of the second NO contact point according to output signals of the coincidence logic controller; a second parallel circuit configured to control a conduction state of the third NO contact point according to output signals of the coincidence logic controller; and a second serial circuit configured to control a conduction state of the fourth NO contact point according to output signals of the coincidence logic controller.

The first serial circuit and the first parallel circuit may receive output signals from the first coincidence logic controller and the second coincidence logic controller that has a same logic structure as the first coincidence logic controller and included in any one of the at least two trains.

The second parallel circuit and second serial circuit may receive output signals from the first coincidence logic controller and the second coincidence logic controller that has a same logic structure as the first coincidence logic controller and included another train of the at least two trains.

At least one of the initiation circuits may include: a third circuit that includes a relay and is configured to switch on or off the relay included in the third circuit to control the conduction state of the second NO contact point; and a fourth circuit that includes a relay and is configured to switch on or off the relay included in the fourth circuit to control the conduction state of the third NO contact point, wherein the first parallel circuit may control to switch on or off the relay included in the third circuit, and the second parallel circuit may control to switch on or off the relay included in the fourth circuit.

The relays included in the third circuit and the fourth circuit may be normally-closed (NC) contact points.

The first serial circuit or the second serial circuit may include two relays that are serially connected, and the two relays may be switched on or off according to output signals of the coincidence logic controller. When all relays are switched on, the first NO contact point or the fourth NO contact point may be closed, or when at least one of the two relays is switched off, the first NO contact point or the fourth NO contact point may be opened.

The first parallel circuit or the second parallel circuit may include two relays that are connected in parallel, and the two relays may be switched on or off according to output signals of the coincidence logic controller. When all relays included in the first parallel circuit or the second parallel circuit are switched off, the relay included in the third circuit or the fourth circuit may be switched on, or when at least one of the two relays included in the first parallel circuit or the second parallel circuit is switched on, the relay included in the third circuit or the fourth circuit may be switched off.

BRIEF DESCRIPTION OF THE DRAWINGS

The above and/or other aspects will be more apparent by describing certain exemplary embodiments, with reference to the accompanying drawings, in which.

DETAILED DESCRIPTION

Figure 1:
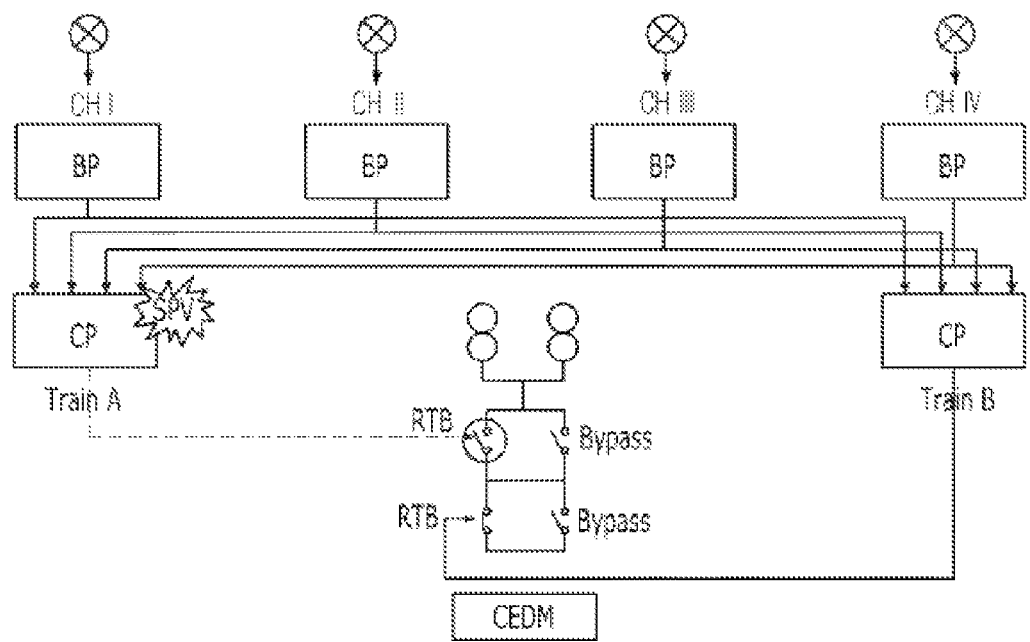
FIG. 1 illustrates single point vulnerability (SPV) that may occur in a structure of a related-art protection system.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

zed.

The configuration units expressed in this specification are merely examples for implementing exemplary embodiment. Accordingly, other configuration units may be used in other implementations of the exemplary embodiment.

Meanwhile, it will be understood that terms, such as 'include', in the specification are 'open type' expressions used to mean that there are corresponding components described in the specification and there is no intent to exclude existence or possibility of other components.

Furthermore, it will be understood that terms, such as "first" or "second", in the specification are used to discriminate one component from another component and do not restrict specific order between components or other characteristics.

In the following description of the embodiments, it will be understood that, when a layer (film), a region, a pattern or a structure is referred to as being "on" or "under" a substrate, another layer (film), another region, another pad or other patterns, it can be "directly" or "indirectly" on the other layer (film), region, pattern or structure, or one or more intervening layers may also be present. Such a position of each layer is described with reference to accompanying drawings.

When an element is mentioned to be "coupled" or "connected" to another element, this may mean that it is directly coupled or connected to the other element, but it is to be understood that yet another element may exist in-between. In addition, it will be understood that the terms "comprises", "comprising", "includes", "including" when used in this specification, specify the presence of one or more other components, but do not preclude the presence or addition of one or more other components unless defined to the contrary.

Expressions such as "at least one of," when preceding a list of elements, modify the entire list of elements and do not modify the individual elements of the list.

FIG. 1 illustrates single point vulnerability (SPV) that may occur in a structure of a related-art protection system.

Referring to FIG. 1, a reactor may stop operating when one reactor trip breaker (RTB) is opened due to a single failure in a first train (Train A) of a reactor protection system.

Figure 2:
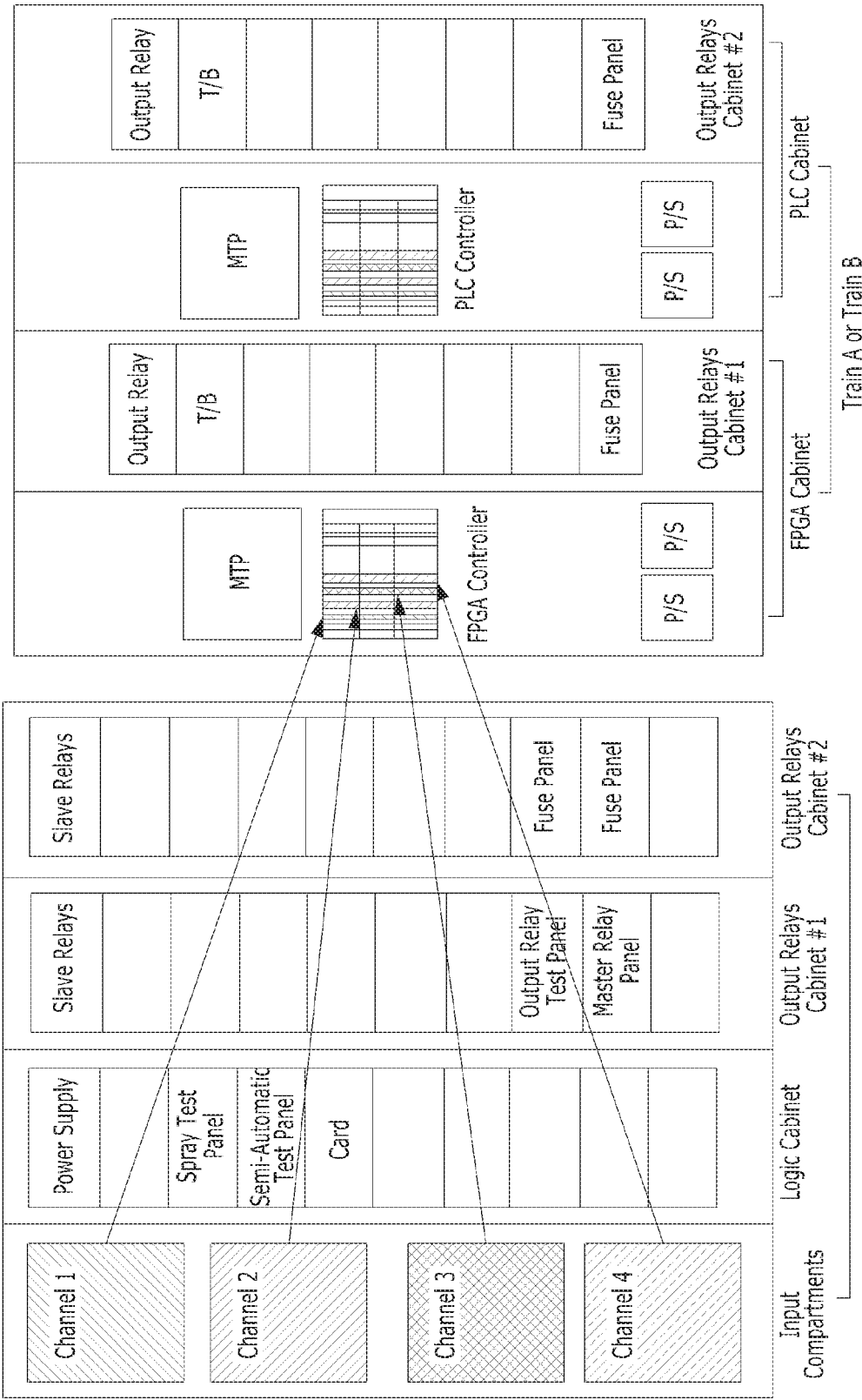
FIG. 2 illustrates a reactor protection system according to an exemplary embodiment, in comparison with a related-art reactor protection system.

FIG. 2 illustrates a reactor protection system according to an exemplary embodiment, in comparison with a related-art reactor protection system.

Referring to FIG. 2, since the related-art reactor protection system disposed in a cabinet operates in an analog method and each logic gate thereof is configured in a form of a hardware card, a number of hard-wired connections is required between respective cards for transmitting signals in order to implement coincidence logic. Thus, the size of the cabinet is increased, the cabling become complicated, and the maintenance of the cabinet becomes difficult.

However, in the digital protection system according to an exemplary embodiment, coincidence logic of the protection system is implemented in software and executed in central processing units (CPUs) or field programmable gate arrays (FPGAs). Thus, the size of the cabinet is reduced, the cabling become simple, and the maintenance of the cabinet becomes easy.

In the digital protection system according to the exemplary embodiment, in order to prevent a common case failure (CCF), duplexed controllers different from each other are used, and a digital protection system is implemented by digitalizing the related-art analog protection system. Thereby, the maintenance of the protection system becomes easy.

Figure 3:
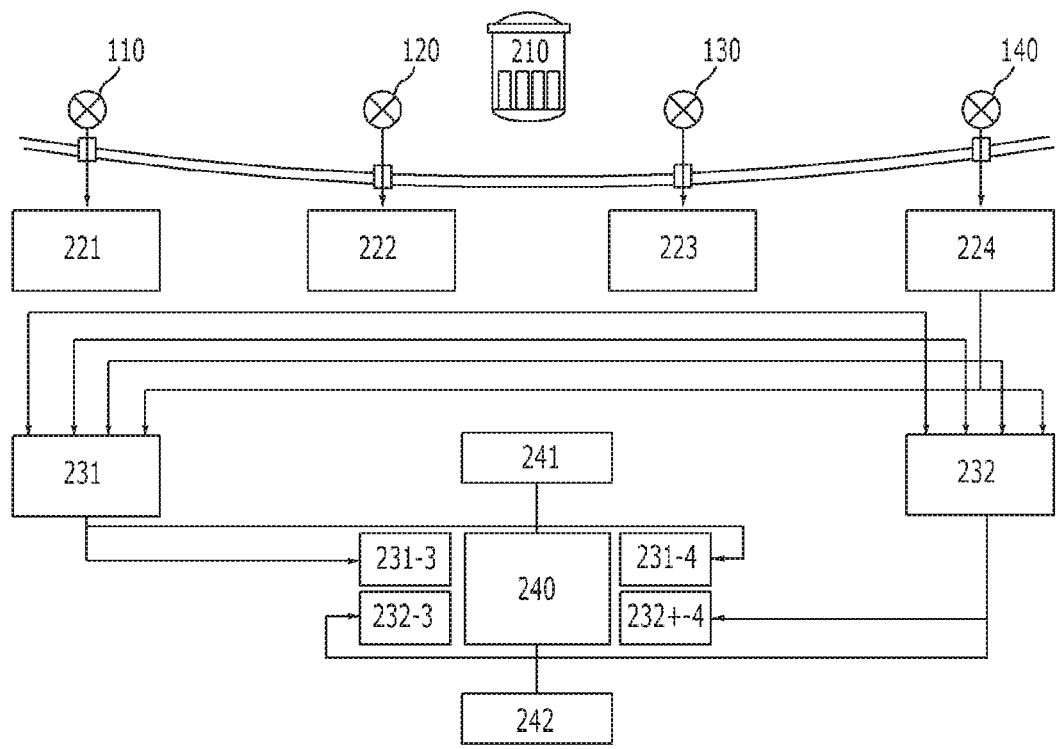
FIG. 3 illustrates a configuration of a digital protection system according to an exemplary embodiment.
Figure 4:
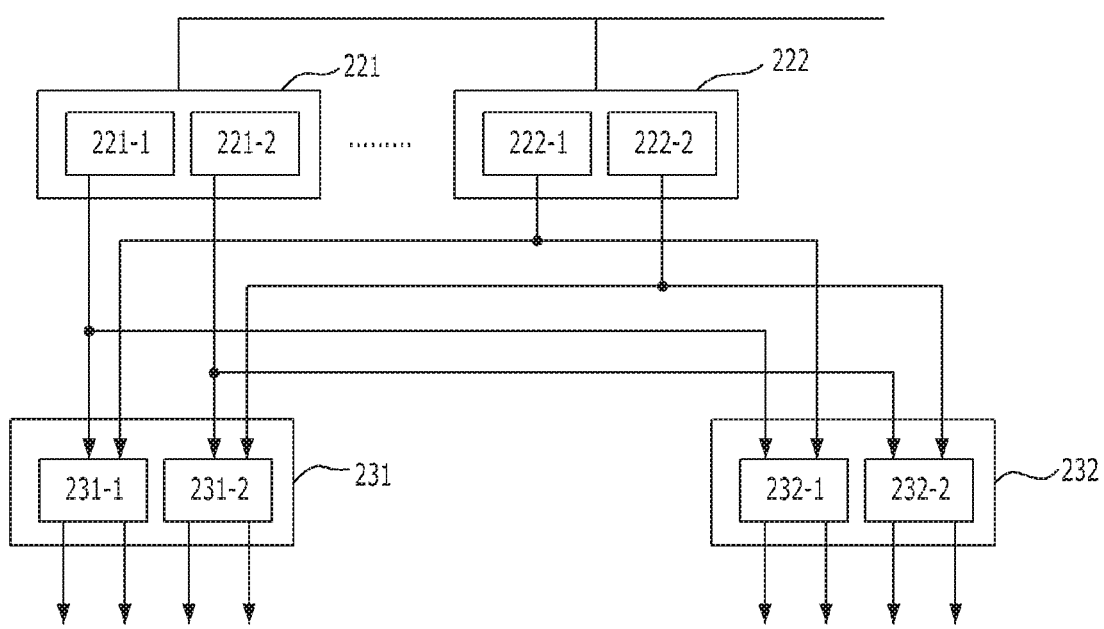
FIG. 4 illustrates configurations of a process protection system and a reactor protection system included in the digital protection system according to an exemplary embodiment.

FIG. 3 illustrates a configuration of a digital protection system according to an exemplary embodiment, and FIG. 4 illustrates configurations of process protection systems 221, 222, 223, and 224, and reactor protection systems 231 and 232 included in the digital protection system, according to an exemplary embodiment.

Referring to FIGS. 3 and 4, in the digital protection system, the process protection system may include four channels 221, 222, 223, and 224, and the reactor protection system may include two trains 231 and 232.

The four channels 221, 222, 223, and 224 of the process protection system may include respective first bistable logic controllers 221-1 and 222-1 and respective second bistable logic controllers 221-2 and 222-2 which are different from each other, and transmit bistable logic results to the two trains 231 and 232 of the reactor protection system.

FIG. 3 shows an embodiment in that the process protection system includes four channels, but it is not limited thereto. The process protection system may include at least one channel.

In detail, the bistable logic controllers 221-1, 222-1, 221-2, and 222-2 of the respective channels 221, 222, 223, and 224 of the process protection system generate bistable logic results based on various process parameters collected from sensors 110, 120, 130, and 140 that are installed in a nuclear steam supply system. In addition, the bistable logic controllers 221-1, 222-1, 221-2, and 222-2 may transmit the bistable logic results to coincidence logic controllers of the respective trains 231 and 232 of the reactor protection system. The bistable logic controllers 221-1, 222-1, 221-2, and 222-2 of the respective channels 221, 222, 223, and 224 may independently perform bistable logic algorithms by receiving signals from multiplexed sensors 110, 120, 130, and 140.

For example, a bistable logic controller included in at least one channel of the process protection system determines whether or not temperature information of a high temperature pipe which is detected by a controller reaches a predetermined protection system setting value, and transmits a signal indicating whether or not the temperature is abnormal to the respective trains 231 and 232 of the reactor protection system. Herein, respective channels of the process protection system are physically/electrically separated from each other, and respective channels independently derive result signals thereof. For example, when a 2 of 4 (2 out of 4) coincidence logic is defined and bistable logic controllers of at least two channels output abnormal signals among four multiplexed process parameters, coincidence logic controllers generate reactor stopping signals.

Although the process protection system is multiplexed in for channels, process parameters may be triplicated or duplicated depending on a type of process. In the triplicated process parameter, signals may be assigned to three channels of the process protection system, and the reactor protection system may perform a 2 of 3 (2 out of 3) coincidence logic based on bistable logic results received from the three channels, and determine whether or not to generate a reactor stopping signal. In the doubled process parameter, signals may be assigned to two channels of the process protection system, and the reactor protection system may perform a 1 of 2 (1 out of 2) coincidence logic based on bistable logic results received from the two channels, and determine whether or not to generate a reactor stopping signal.

The coincidence logic is not limited to 1 of 2, 2 of 3, and 3 of 4 coincidence logic. The coincidence logic may be 2 of 2, 1 of 3, 3 of 3, 3 of 4, etc. When n of m coincidence logic is defined for the above described coincidence logic or for a later coincidence logic to be described, all coincidence logic in which the n is equal to or less than the m may be possible.

The first bistable logic controllers and the second bistable logic controllers of the respective channels of the process protection system may be configured with types different and independent from each other. For example, the first bistable logic controller may be formed based on FPGA, the second bistable logic controller may be formed based on programmable logic controller (PLC), and the two bistable logic controllers may be independently controlled from each other. Accordingly, when a CCF occurs in one controller, a unique function of the process protection system may be performed in another controller since the two bistable logic controllers are configured with types different from each other. Thus, it may be possible to efficiently respond to SPV and a CCF.

Herein, each bistable logic controller may transmit the bistable logic result to all coincidence logic controllers that are the same type. Since the first bistable logic controllers 221-1, 222-1, 223-1, and 224-1 and the second bistable logic controllers 221-2, 222-2, 223-2 and 224-2 of the process protection system are configured with types different from each other, and the first coincidence logic controllers 231-1 and 232-1, and the second coincidence logic controllers 231-2 and 232-2 are also configured with types different from each other, two protection systems are actually operated by independently controlling the same types of devices in the entire interior, in other words, thoroughly from the process protection system (bistable logic controller) to the reactor protection system (coincidence logic controller), of the protection system. For example, since a device based on FPGA independently operates and is not affected by a device based on PLC, there is no effect on the protection system in performing safety functions when a CCF occurs.

The respective trains 231 and 232 of the reactor protection system may include first coincidence logic controllers 231-1 and 232-1 and second coincidence logic controllers 231-2 and 232-2 which are configured with types different from each other, perform coincidence logic according to the bistable logic results, and transmit final control signals to an reactor trip switchgear system (RTSS) through an initiation circuit.

Herein, the reactor protection system may include a first train 231 and a second train 232. The first train 231 may include a first coincidence logic controller 231-1, a second coincidence logic controller 231-2, a first train serial initiation circuit 231-3, and a first train parallel initiation circuit 231-4. The second train 232 may include a first coincidence logic controller 232-1, a second coincidence logic controller 232-2, a second train parallel initiation circuit 232-3, and a second train serial initiation circuit 232-4.

The coincidence logic controllers 231-1, 232-1, 231-2, and 232-2 of the reactor protection system receive bistable logic results transmitted from the process protection system. Herein, the coincidence logic controllers 231-1, 232-1, 231-2, and 232-2 of the reactor protection system receive bistable logic results from all multiplexed channels of the process protection system.

In detail, the coincidence logic controllers 231-1, 232-1, 231-2, and 232-2 perform coincidence logic according to a number of channel trips (abnormal signal) included in the bistable logic results, and transmit a final reactor stopping signal to the RTSS 240 through initiation circuits 231-3, 232-3, 231-4, and 232-4.

For example, when a 2 of 4 coincidence logic is performed on four multiplexed process parameters and the bistable logic results include at least two abnormal signals, the reactor may be determined to be abnormal. Accordingly, when at least two channels among the four channels of the process protection system detect abnormality of the reactor, the digital protection system determines that the reactor is in an abnormal situation and takes actions such as dropping a control element.

The RTSS 240 may normally operate the reactor when the nuclear steam supply system is in a normal state, and stop operating the reactor when the nuclear steam supply system is in an abnormal state according to control signals that are transmitted from the initiation circuits 231-3, 232-3, 231-4, and 232-4 of the respective trains of the reactor protection system.

Herein, the RTSS 240 may perform safety functions even though a single failure or a CCF occurs in the bistable logic controller or in the coincidence logic controller. Since the controllers of the reactor protection system are configured with coincidence logic controllers of types different from each other, when a CCF occurs in one of the coincidence logic controllers, a control signal path associated with the CCF may be ensured by another coincidence logic controller.

Figure 5:
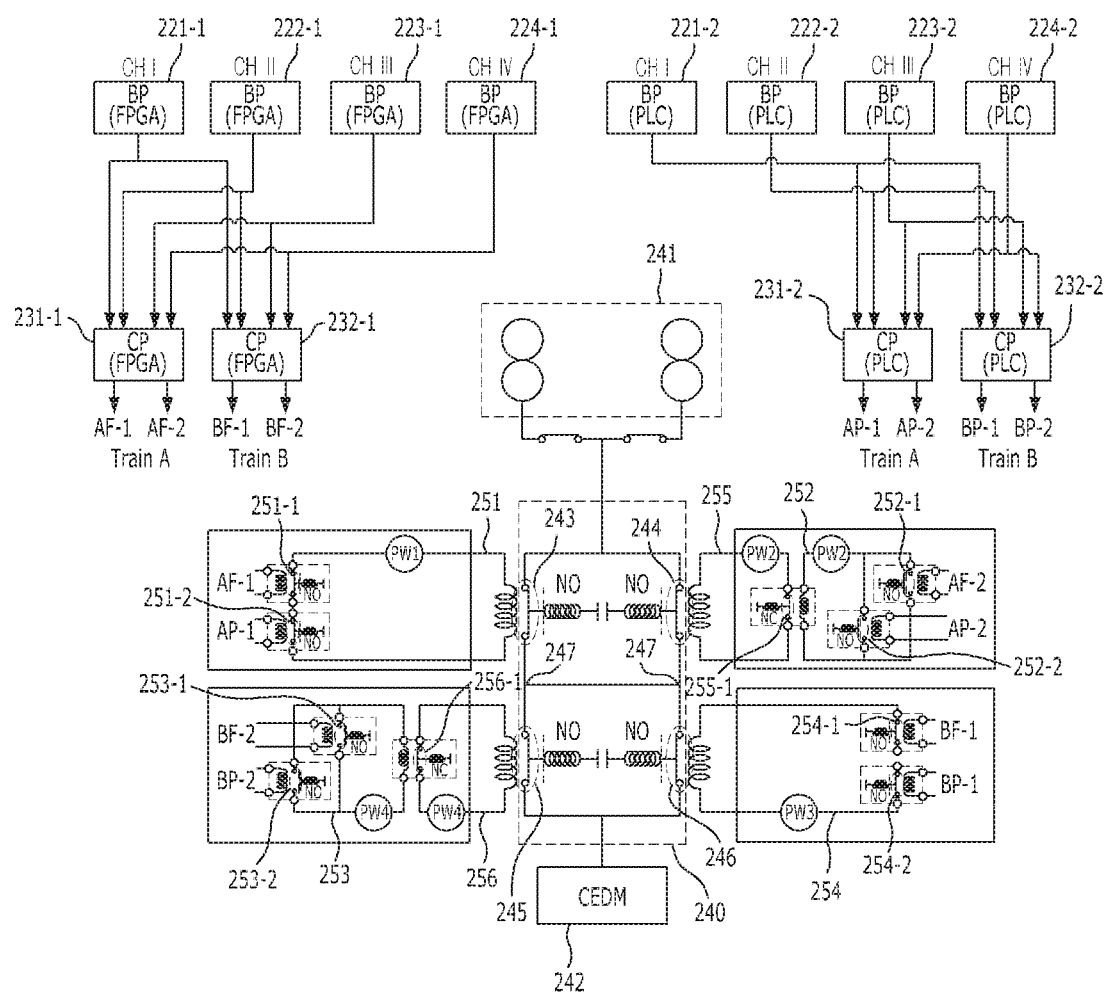
FIG. 5 illustrates a representative diagram of an exemplary embodiment, in which a digital protection system, a reactor trip switchgear system (RTSS), a motor-generator set (MG-SET), and a control element drive mechanism (CEDM) are connected.

FIG. 5 shows a detailed exemplary embodiment of the digital protection system and the RTSS 240. Herein, FIG. 5 clearly shows a control signal path by grouping the controllers of the same type.

The digital protection system includes: a process protection system that includes at least two channels, each channel including a first bistable logic controller and a second bistable logic controller which are different and independent from each other, the first bistable logic controller and the second bistable logic controller output bistable logic results by receiving input of process parameters; and a reactor protection system that includes at least two trains, each train including a first coincidence logic controller and a second coincidence logic controller which are different and independent from each other, the first coincidence logic controller and the second coincidence logic controller output coincidence logic results by receiving input of the bistable logic results. The reactor protection system further includes at least two initiation circuits, each initiation circuit including a serial circuit in which a plurality of relays are serially connected, and a parallel circuit in which a plurality of relays are connected in parallel. The plurality of relays included in the serial circuit is switched ON/OFF by receiving as input coincidence logic results of the coincidence logic controllers of types different from each other. The plurality of relays included in the parallel circuit is switched ON/OFF by receiving as input coincidence logic results of the coincidence logic controllers of types different from each other.

Each channel of the process protection system includes first bistable logic controllers 221-1, 222-1, 223-1, and 224-1 and second bistable logic controllers 221-2, 222-2, 223-2, and 224-2 which are different and independent from each, and the first bistable logic controllers 221-1, 222-1, 223-1, and 224-1 and the second bistable logic controllers 221-2, 222-2, 223-2, and 224-2 output bistable logic results by receiving as input process parameters. The process protection system includes at least two channels.

As shown in FIG. 5, the process protection system includes at least two channels. Each channel includes first bistable logic controllers 221-1, 222-1, 223-1, and 224-1 and second bistable logic controllers 221-2, 222-2, 223-2, and 224-2 which are different and independent from each other.

The first bistable logic controllers 221-1, 222-1, 223-1, and 224-1 may be formed based on FPGA, and the second bistable logic controllers 221-2, 222-2, 223-2, and 224-2 may be formed based on PLC. The two types of bistable logic controllers may be independently controlled.

Each train of the reactor protection system includes first coincidence logic controllers 231-1 and 232-1 and second coincidence logic controllers 231-2 and 232-2 which are different and independent from each other. The first coincidence logic controllers 231-1 and 232-1 and the second coincidence logic controllers 231-2 and 232-2 output coincidence logic results by receiving as input the bistable logic results. The reactor protection system includes at least two trains.

As shown in FIG. 5, the reactor protection system includes at least two trains. Each train includes first coincidence logic controllers 231-1 and 232-1 and second coincidence logic controller 231-2 and 232-2 which are different and independent from each other.

The first coincidence logic controllers 231-1 and 232-1 may be formed based on FPGA, and the second coincidence logic controllers 231-2 and 232-2 may be formed based on PLC. The two types of coincidence logic controllers may be independently controlled.

The digital protection system further includes at least two initiation circuits. Initiation circuits 231-3 and 231-4 included in a first train include a serial circuit 251 in which a plurality of relays 251-1 and 251-2 is serially connected, and a parallel circuit 252 in which a plurality of relays 251-1 and 251-2 is connected in parallel. Initiation circuits 232-3, 232-4 included in a second train include a serial circuit 254 in which a plurality of relays 254-1 and 254-2 is serially connected, and a parallel circuit 253 in which a plurality of relays 253-1 and 253-2 is connected in parallel.

The plurality of relays 251-1, 251-2, 254-1, and 254-2 included in the serial circuits 251 and 254 is switched ON/OFF by receiving as input coincidence logic results of coincidence logic controllers that are different from each other. The plurality of relays 252-1, 252-2, 253-1, and 253-2 included in the parallel circuits 252 and 253 is switched ON/OFF by receiving as input coincidence logic results of coincidence logic controllers that are different from each other.

In detail, the relay 251-1 included in the serial circuit 251 is switched ON/OFF by receiving as input a coincidence logic result AF-1, and the relay 251-2 included in the serial circuit 251 is switched ON/OFF by receiving as input a coincidence logic result AP-1 that is different from the coincidence logic result AF-1.

The relay 251-1 included in the serial circuit 251 is switched ON/OFF by receiving as input the coincidence logic result AF-1, and the relay 251-2 included in the serial circuit 251 is switched ON/OFF by receiving as input the coincidence logic result AP-1 that is different from the coincidence logic result AF-1.

The relay 254-1 included in the serial circuit 254 is switched ON/OFF by receiving as input a coincidence logic result BF-1, and the relay 254-2 included in the serial circuit 254 is switched ON/OFF by receiving as input a coincidence logic result BP-1 that is different from the coincidence logic result BF-1.

The relay 252-1 included in the parallel circuit 252 is switched ON/OFF by receiving as input a coincidence logic result AF-2, and the relay 252-2 included in the parallel circuit 252 is switched ON/OFF by receiving as input a coincidence logic result AP-2 that is different from the coincidence logic result AF-2.

The relay 253-1 included in the parallel circuit 253 is switched ON/OFF by receiving as input a coincidence logic result BF-2, and the relay 253-2 included in the parallel circuit 253 is switched ON/OFF by receiving as input a coincidence logic result BP-2 that is different from the coincidence logic result BF-2.

The process protection system includes a first channel, a second channel, a third channel, and a fourth channel. However, a number of the channels is not limited thereto, and may be at least one.

The reactor protection system includes a first train (Train A) and a second train (Train B).

The process protection system includes first bistable logic controllers 221-1, 222-1, 223-1, and 224-1 that are based on FPGA, and second bistable logic controllers 221-2, 222-2, 223-2, and 224-2 that are based on PLC.

The bistable logic controllers transmit the bistable logic results to all coincidence logic controllers that are the same type.

The reactor protection system includes first coincidence logic controllers 231-1 and 232-1 that are based on FPGA, and second coincidence logic controllers 231-2 and 232-2 that are based on PLC.

The first bistable logic controllers 221-1, 222-1, 223-1, and 224-1 that are based on FPGA transmit bistable logic results to the first coincidence logic controllers 231-1 and 232-1 that are based on the same FPGA The second bistable logic controllers 221-2, 222-2, 223-2, and 224-2 that are based on PLC transmit bistable logic results to the second coincidence logic controllers 231-2 and 232-2 that are based on the same PLC.

The process parameter includes at least one of temperature information about a high temperature pipe and a low temperature pipe of a reactor coolant, pressurizer pressure information, pressurizer water level information, neutron flux information, reactor coolant flow rate information, containment building pressure information, steam generator water level information, steam pipe pressure information, and refueling water tank water level information.

The sensor that is described above transmits at least one piece of information included in the process parameter to at least one channel of the process protection system. A number of process parameters and a type thereof that are transmitted to a first channel, a second channel, a third channel, and a fourth channel may be the same or different so that each channel receives at least one piece of information included in the process parameter.

The first coincidence logic controllers 231-1 and 232-1 receive bistable logic results including a normal signal or an abnormal signal from the first bistable logic controllers 221-1, 222-1, 223-1, and 224-1 included in respective channels of the process protection system, and output coincidence logic results based on a number of bistable logic results and a number of abnormal signals, the respective coincidence logic results include two output signals that are different from each other. One of the two output signals is input to first relays 251-2 and 254-1 included in the serial circuit, and the other one of the two output signals is input to first relays 252-1 and 253-1 included in the parallel circuit.

The first bistable logic controllers 221-1, 222-1, 223-1, and 224-1 determine whether to output normal signals or abnormal signals by comparing the received process parameters and a preset value. The first bistable logic controllers 221-1, 222-1, 223-1, and 224-1 respectively output bistable logic results corresponding to a number of received process parameters. In other words, when the first bistable logic controller 221-1 receives three process parameters, the first bistable logic controller 221-1 outputs three bistable logic results by comparing the respective process parameters and a preset value.

The first coincidence logic controllers 231-1 and 232-1 output coincidence logic results based on a number of all received bistable logic results and a number of bistable logic results that are abnormal signals. Herein, for respective process parameters, an n/m coincidence logic is defined by a number m of total bistable logic results and a number n of bistable logic results that are abnormal signals, and when the defined n/m coincidence logic satisfies at least one process parameter, the first coincidence logic controllers 231-1 and 232-1 output coincidence logic results which are reactor stopping signals by executing the n/m coincidence logic.

Based on FIG. 5, when the first coincidence logic controllers 231-1 and 232-1 output coincidence logic results that are reactor stopping signals, AF-1 becomes '0', AF-2 becomes '1', BF-1 becomes '0', and BF-2 becomes '1'.

The second coincidence logic controller receives bistable logic results including a normal signal or an abnormal signal from the second bistable logic controllers included in respective channels, and outputs coincidence logic results based on a number of bistable logic results and a number of abnormal signals, the respective coincidence logic results including two output signals that are different from each other. One of the two output signals is input to second relays 251-2 and 254-2 included in the serial circuit, and the other one of the two output signals is input to second relays 252-2 and 253-2 included in the parallel circuit.

The second bistable logic controllers 221-2, 222-2, 223-2, and 224-2 determine whether to output normal signals or abnormal signals by comparing the received process parameters and a preset value. The second bistable logic controllers 221-2, 222-2, 223-2, and 224-2 respectively output bistable logic results corresponding to a number of received process parameters. In other words, when the second bistable logic controllers 221-2, 222-2, 223-2, and 224-2 receive three process parameters, the second bistable logic controllers 221-2, 222-2, 223-2, and 224-2 respectively output three bistable logic results by comparing the respective process parameters and a preset value.

The second coincidence logic controllers 231-2 and 232-2 output coincidence logic results based on a number of total received bistable logic results and a number of bistable logic results that are abnormal signals. Herein, for respective process parameters, an n/m coincidence logic is defined by a number m of total bistable logic results and a number n of bistable logic results that are abnormal signals, and when the defined n/m coincidence logic satisfies at least one process parameter, the second coincidence logic controllers 231-2 and 232-2 output coincidence logic results that are reactor stopping signals by executing the n/m coincidence logic.

Based on FIG. 5, when the second coincidence logic controllers 231-2 and 232-2 output coincidence logic results that are reactor stopping signals, AP-1 becomes '0', AP-2 becomes '1', BP-1 becomes '0', and BP-2 becomes '1'.

When at least one abnormal signal is included in the bistable logic results, the first coincidence logic controllers 231-1 and 232-1 output coincidence logic results. Output signals AF-1 and BF-1 of the coincidence logic results which are '0' are input to first relays 251-1 and 254-1 included in the serial circuit, and output signals AF-2 and BF-2 of the coincidence logic results which are '1' are input to first relays 252-1 and 253-1 included in the parallel circuit. The coincidence logic results are reactor stopping signals.

When at least one abnormal signal is included in the bistable logic results, the second coincidence logic controllers 231-2 and 232-2 output coincidence logic results. Output signals AP-1 and BP-1 of the coincidence logic results which are '0' are input to first relays 251-2 and 254-2 included in the serial circuit, and output signals AP-2 and BP-2 of the coincidence logic results which are '1' are input to first relays 252-2 and 253-2 included in the parallel circuit. The coincidence logic results are reactor stopping signals.

When at least one normal signal is included in the bistable logic results, the first coincidence logic controllers 231-1 and 232-1 output coincidence logic results. Output signals AF-1 and BF-1 of the coincidence logic results which are '1' are input to first relays 251-1 and 254-1 included in the serial circuit, and output signals AF-2 and BF-2 of the coincidence logic results which are '0' are input to first relays 252-1 and 253-1 included in the parallel circuit. The coincidence logic results are reactor operating signals.

When at least one normal signal is included in the bistable logic results, the second coincidence logic controllers 231-2 and 232-2 output coincidence logic results. Output signals AF-1 and BF-1 of the coincidence logic results which are '1' are input to second relays 251-2 and 254-2 included in the serial circuit, and output signals AP-2 and BP-2 of the coincidence logic results which are '0' are input to second relays 252-2 and 253-2 included in the parallel circuit. The coincidence logic results are reactor operating signals.

The digital protection system further includes an RTSS 240, the RTSS 240 is configured with 4 RTBs, and each RTB may include a first normally open (NO) contact point 243, a second NO contact point 244, a third NO contact point 245, and a fourth NO contact point 246. The first NO contact point 243, the second NO contact point 244, the first NO contact point 245, and the fourth NO contact point 246 may be implemented with switches which are open in the absence of force, and provide a path for the current when the switches are pressed.

A motor-generator set (MG-SET) 241 supplies operating power to operate a control element drive mechanism (CEDM) 242.

In the RTSS 240 according to an exemplary embodiment, when the NO contact points 243, 244, 245, and 246 are disposed between the MG-SET 241 and the CEDM 242, operating power of the MG-SET 241 may be supplied to the CEDM 242 according to whether the NO contact points 243, 244, 245, and 246 are switched ON/OFF.

In detail, when at least one of the first NO contact point 243 and the second NO contact point 244 is in a closed state, and at least one of the third NO contact point 245 and the fourth NO contact point 246 is a closed state, the operating power of the MG-SET 241 is supplied to the CEDM 242. Since the first NO contact point 243 and the second NO contact point 244 are connected in parallel, and the third NO contact point 245 and the fourth NO contact point 246 are connected in parallel, a circuit having a shape of "⊓" may selectively supply the operating power to the CEDM 242.

When both of the first NO contact point 243 and the second NO contact point 244 are in opened states, or both of the third NO contact point 245 and the fourth NO contact point 246 are in opened states, the power of the MG-SET 241 supplied to the CEDM 242 is blocked.

The CEDM 242 may adjust a position of a control element to control nuclear reactivity of the reactor. In addition, since the CEDM 242 directly holds the control element by using the operating power supplied from the MG-SET, the control element may be pulled down by gravity when the operating power supplied from the MG-SET 241 is blocked.

In detail, when the operating power is not supplied, the CEDM 242 stops the reactor by dropping the control element, and when the operating power is supplied, the CEDM 242 normally operates the reactor by maintaining the position of the control element. Since when the control element is dropped, the reactor immediately stops operating, rapid response may be available when an abnormality occurs in the reactor.

Since the RTSS according to an exemplary embodiment includes 4 RTBs, and each RTB is configured with NO contact points 243, 244, 245, and 246, the protection system may be stably operated by co-operations between the serial circuit and the parallel circuit when a common failure factor occurs.

In case of the NO contact point, a fixed contact point and a driving contact point are separated from each other in an initial state. The fixed contact point and the driving contact point are connected to each other, and current flows therethrough when an external force is applied thereto. In other words, when an external force (for example, electromagnetic force) is applied in an original opened state, the fixed contact point and the driving contact point become a closed state by being connected to each other. In FIG. 5, when current flows in the serial circuit, the contact points 243, 244, 245, and 246 may become closed states from opened states by electromagnetic force generated in coils.

In an normally-closed (NC) contact point that will be described later, a fixed contact point and a driving contact point are connected to each other in an initial state. The fixed contact point and the driving contact point are separated from each other when an external force is applied thereto, thus current does not flow therethrough. In other words, when an external force (for example, electromagnetic force) is applied in an original closed state, the fixed contact point and the driving contact point become an opened state by releasing the connection therebetween. In FIG. 5, an NC contact point 255-1 of a relay included in a third circuit may be changed from a closed state to an opened state due to electromagnetic force occurring in coils when current flows in a first parallel circuit.

The first NO contact point 243 is disposed between the MG-SET 241 and a central node 247.

The second NO contact point 244 is disposed between the MG-SET 241 and the central node 247.

The third NO contact point 245 is disposed between the central node 247 and the CEDM 242.

The fourth NO contact point 246 is disposed between the central node 247 and the CEDM 242.

In order to apply a design that minimizes unnecessary stops of the reactor while unique safety functions of the protection system are maintained, the digital protection system according to the exemplary embodiment is configured to include an RTSS having a " ⊣ "-shaped structure, and the RTSS receives a calculation result from each train of the reactor protection system.

In addition, the RTSS according to an exemplary embodiment may include a first serial circuit 251, a first parallel circuit 252, a second parallel circuit 253, and a second serial circuit 254. The serial circuits 251 and 254 or the parallel circuits 252 and 253 may control to supply power to the CEDM by opening and closing the NO contact points 243, 244, 245, and 246.

The first parallel circuit and the second parallel circuit may respectively and indirectly control the NO contact points 244 and 245. As it will be described later, the first parallel circuit 252 controls a contact point 255-1 of a relay included in the third circuit, and the third circuit directly controls to close/open the second NO contact point 244. The second parallel circuit 253 controls a contact point 256-1 of a relay included in a fourth circuit, and the fourth circuit directly controls to close/open the third NO contact point 245.

For this, output signals of the coincidence logic controllers include serial circuit control signals AF-1, AP-1, BF-1, and BP-1, and parallel circuit control signals AF-2, AP-2, BF-2, and BP-2, the first coincidence logic controllers 231-1 and 232-1 or the second coincidence logic controllers 232-1 and 232-2 generate the serial circuit control signals AF-1, AP-1, BF-1, and BP-1, and the parallel circuit control signals AF-2, AP-2, BF-2, and BP-2.

For example, output signals of the coincidence logic controllers control the serial circuits 251 and 254 to be switched ON/OFF, and the NO contact points 243 and 246 connected to serial circuits 251 and 254 may be repeatedly connected to each other or separated from each other according to switching ON/OFF of the serial circuits 251 and 254.

The initiation circuit includes: a first serial circuit that controls to close/open the first NO contact point according to an output signal of the coincidence logic controller; a first parallel circuit that controls to close/open the second NO contact point according to an output signal of the coincidence logic controller; a second parallel circuit that controls to close/open the third NO contact point according to an output signal of the coincidence logic controller; and a second serial circuit that controls to close/open the fourth NO contact point according to an output signal of the coincidence logic controller.

The first serial circuit 251 may control to close/open the first NO contact point 243 according to an output signal of the coincidence logic controller.

The first parallel circuit 252 may control to close/open the second NO contact point 244 according to an output signal of the coincidence logic controller. In detail, the first parallel circuit 252 may control to close/open the second NO contact point 244 according to an output signal of the coincidence logic controller by using a third circuit 255.

The second parallel circuit 253 may control to close/open the third NO contact point 245 according to an output signal of the coincidence logic controller. In detail, the second parallel circuit 253 may control to close/open the third NO contact point 245 according to an output signal of the coincidence logic controller by using a fourth circuit 256.

The second serial circuit 254 may control to close/open the fourth NO contact point 246 according to an output signal of the coincidence logic controller.

The first serial circuit 251 and the first parallel circuit 252 receive as input output signals AF-1, AF-2, AP-1, and AP-2 of the first coincidence logic controller 231-1 and the second coincidence logic controller 231-2 which are the same kind and are included in one train. For example, the first coincidence logic controller 231-1 and the second coincidence logic controller 231-2 may be implemented with FPGA to have the same logic structure.

The second serial circuit 253 and the second parallel circuit 254 receive as input output signals BF-1, BF-2, BP-1, and BP-2 of the first coincidence logic controller 232-1 and the second coincidence logic controller 232-2 which are the same kind and which are included in other train.

The initiation circuit includes the third circuit 255 that includes a relay 255-1 and controls to close/open to second NO contact point 244 according to switching ON/OFF of the relay 255-1, and the fourth circuit 256 that includes a relay 256-1 and controls to close/open the third NO contact point 245 according to switching ON/OFF of the relay 256-1. The first parallel circuit 252 controls to switch ON/OFF the relay 255-1 included in the third circuit 255, and the second parallel circuit 253 controls to switch ON/OFF the relay 256-1 included in the fourth circuit 256.

The relays 255-1 and 256-1 included in the third circuit 255) and the fourth circuit 256 are NC contact points.

Herein, the first serial circuit 251, the first parallel circuit 252, the second parallel circuit 253, and the second serial circuit 254 receive control signals from coincidence logic controllers that are different from each other. Since the serial circuits or the parallel circuits constituting the initiation circuit according to the exemplary embodiment receive control signals from coincidence logic controllers that are different from each other, safety of the reactor may be maintained even though any one of coincidence logic controllers stops operating.

In detail, the first serial circuit 251 or the second serial circuit 254 includes two relays that are serially connected, the relays are switched ON/OFF by output signals of the coincidence logic controllers. When both relays are switched ON, the first NO contact point 243 or the fourth NO contact point 246 is switched ON. When at least one of the two relays is switched OFF, the first NO contact point 243 or the fourth NO contact point 246 is switched OFF.

Describing the above features with the first serial circuit 251 described above, when the first serial circuit 251 includes the relays 251-1 and 251-2 that are serially connected, the relays 251-1 and 251-2 are switched ON/OFF according to an output signal of the coincidence logic controller. When both of the relays 251-1 and 251-2 are switched ON, the first NO contact point 243 is switched ON. When at least one of the relays 251-1 and 251-2 is switched OFF, the first NO contact point 243 is switched OFF.

Describing the above features with the second serial circuit 254, the second serial circuit 254 includes the relays 254-1 and 254-2 that are serially connected, the relays 254-1 and 254-2 are switched ON/OFF according to an output signal of the coincidence logic controller. When both of the relays 254-1 and 254-2 are switched ON, the fourth NO contact point 246 is switched ON. When at least one of the relays 254-1 and 254-2 is switched OFF, the fourth NO contact point 246 is switched OFF.

The relays included in a serial circuit receive output signals of coincidence logic controllers that are different from each other. For example, when switching ON signals are received from a coincidence logic controller based on FPGA and from a coincidence logic controller based on PLC, the first serial circuit 251 switches ON the two relays, thus the first NO contact point 243 becomes a closed state.

Alternatively, according to the feature of the serial circuit, when at least one output signal of the coincidence logic controller based on FPGA or the coincidence logic controller based on PLC is a switching OFF signal, the serial circuit 251 is switched OFF, and the first NO contact point 243 becomes an opened state.

In detail, when the first parallel circuit 252 or the second parallel circuit 253 includes two relays that are connected in parallel, the relays are switched ON/OFF according to an output signal of the coincidence logic controller. When both relays are switched OFF, the relay included in the third circuit 255 or the fourth circuit 256 is switched ON. When at least one of the two relays is switched ON, the relay included in the third circuit 255 or in the fourth circuit 256 is switched OFF.

Describing the above features with the first parallel circuit 252, the first parallel circuit 252 includes two relays 252-1 and 252-2 that are connected in parallel, the relays 252-1 and 252-2 are switched ON/OFF according to an output signal of the coincidence logic controller. When both relays 252-1 and 252-2 are switched OFF, the relay 255-1 included in the third circuit 255 is switched ON. When at least one of the two relays 252-1 and 252-2 is switched ON, the relay 255-1 included in the third circuit 255 is switched OFF.

Describing the above features with the second parallel circuit 253, the second parallel circuit 253 includes two relays 253-1 and 253-2, and the relays 253-1 and 253-2 are switched ON/OFF according to an output signal of the coincidence logic controller. When both relays 253-1 and 253-2 are switched OFF, the relay 256-1 included in the fourth circuit 256 is switched ON. When at least one of the two relays 253-1 and 253-2 is switched ON, the relay 256-1 included in the fourth circuit 256 is switched OFF.

Accordingly, when all of the relays included in the first parallel circuit 252 are switched OFF, the relay included in the third circuit 255 is switched ON, thus the second NO contact point 244 becomes a closed state.

In addition, when all of the relays included in the second parallel circuit 253 are switched OFF, the relay included in the fourth circuit 256 is switched ON, thus the third NO contact point 245 becomes a closed state.

When at least one of the relays included in the first parallel circuit 252 is switched ON, the relay included in the third circuit 255 is switched OFF, thus the second NO contact point 244 becomes an opened state.

In addition, when at least one of the relays included in second parallel circuit 253 is switched ON, the relay included in the fourth circuit 256 is switched OFF, thus the third NO contact point 245 becomes an opened state. Herein, the relays included in the third circuit 255 and the fourth circuit 256 are NC contact points 255-1 and 256-1.

The relays constituting the parallel circuit receive control signals from coincidence logic controllers that are different from each other. For example, when the relays receive a control signal (switching OFF) from a coincidence logic controller based on FPGA, and a control signal (switching OFF) from a coincidence logic controller based on PLC, the first parallel circuit 252 switches OFF the two relays thereof, thus the second NO contact point 244 becomes an opened state.

Alternatively, according to the feature of the parallel circuit, when at least one of output signals of the coincidence logic controller based on FPGA and the coincidence logic controller based on PLC is a switching ON signal, the parallel circuit becomes a closes state, thus the second NO contact point 244 becomes an opened state.

Accordingly, in the digital protection system according to an exemplary embodiment, power is supplied in the following sequence: MG-SET-RTSS-CEDM. The CEDM drops the control element to stop the reactor even though the power is not supplied to the CEDM according to closed/opened states of the contact points of the RTSS.

Figure 6A:
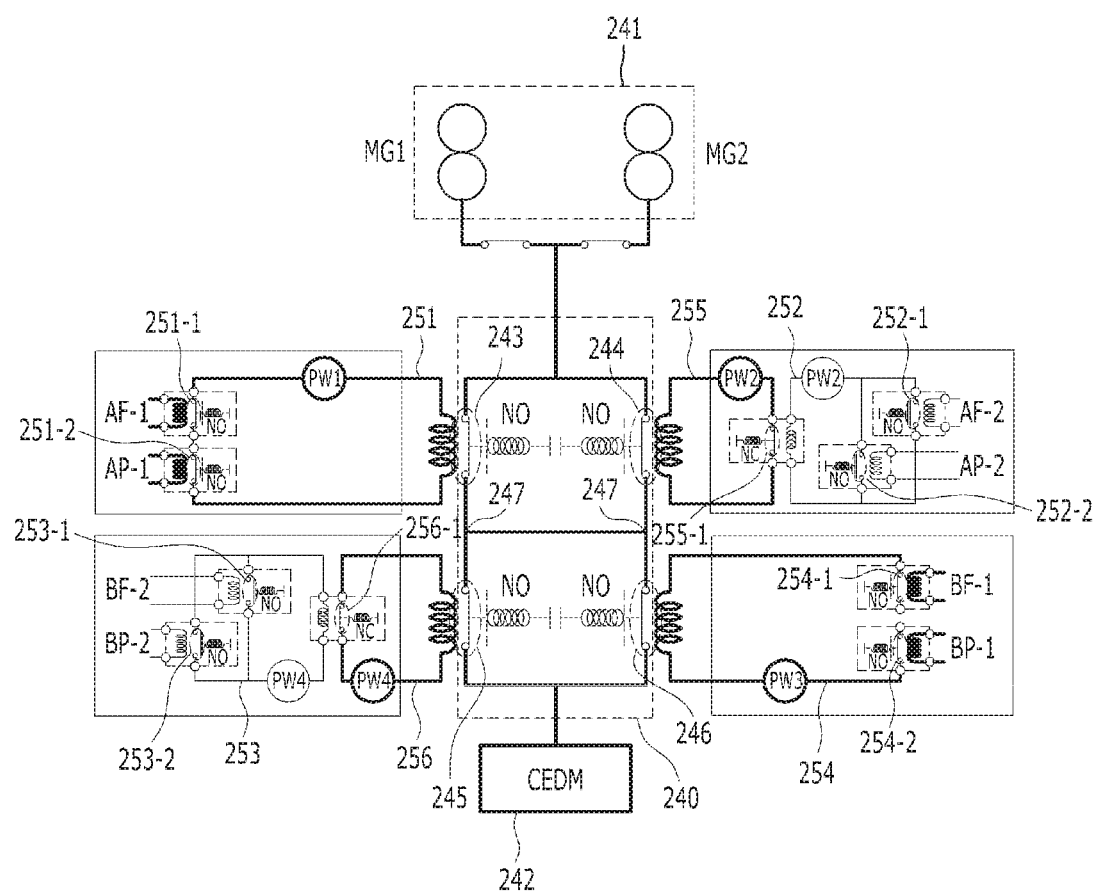
FIGS. 6A, 6B, 6C, 6D, 6E, 6F, 6G, 6H, 6I, 6J, 6K, 6L, 6M, and 6N illustrate various embodiments in which a digital protection system normally operates or stops a reactor according to various failure types.
Figure 6B:
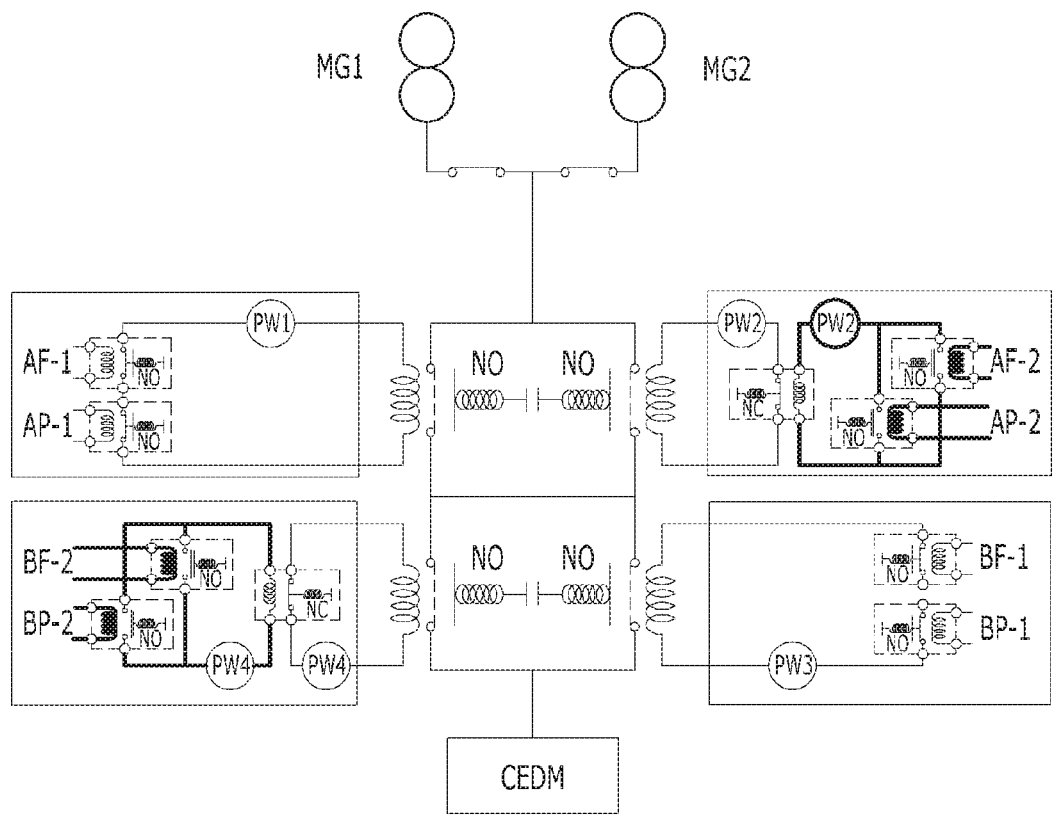
Figure 6C:
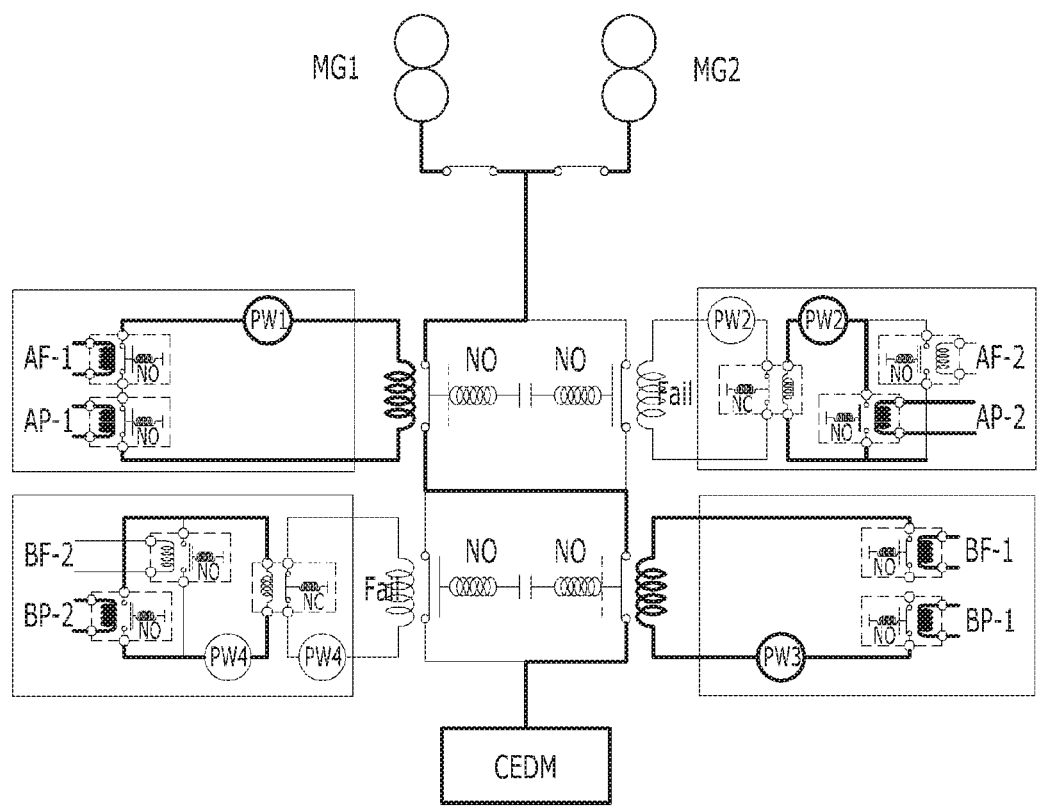
Figure 6D:
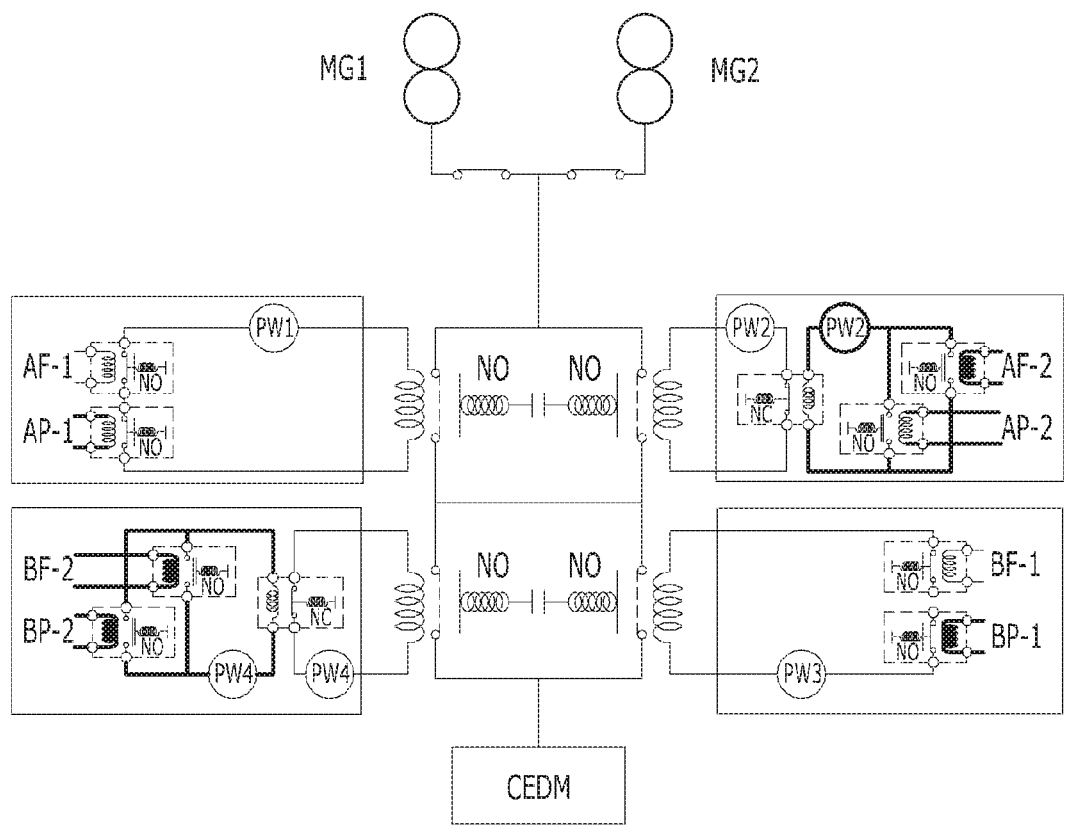
Figure 6E:
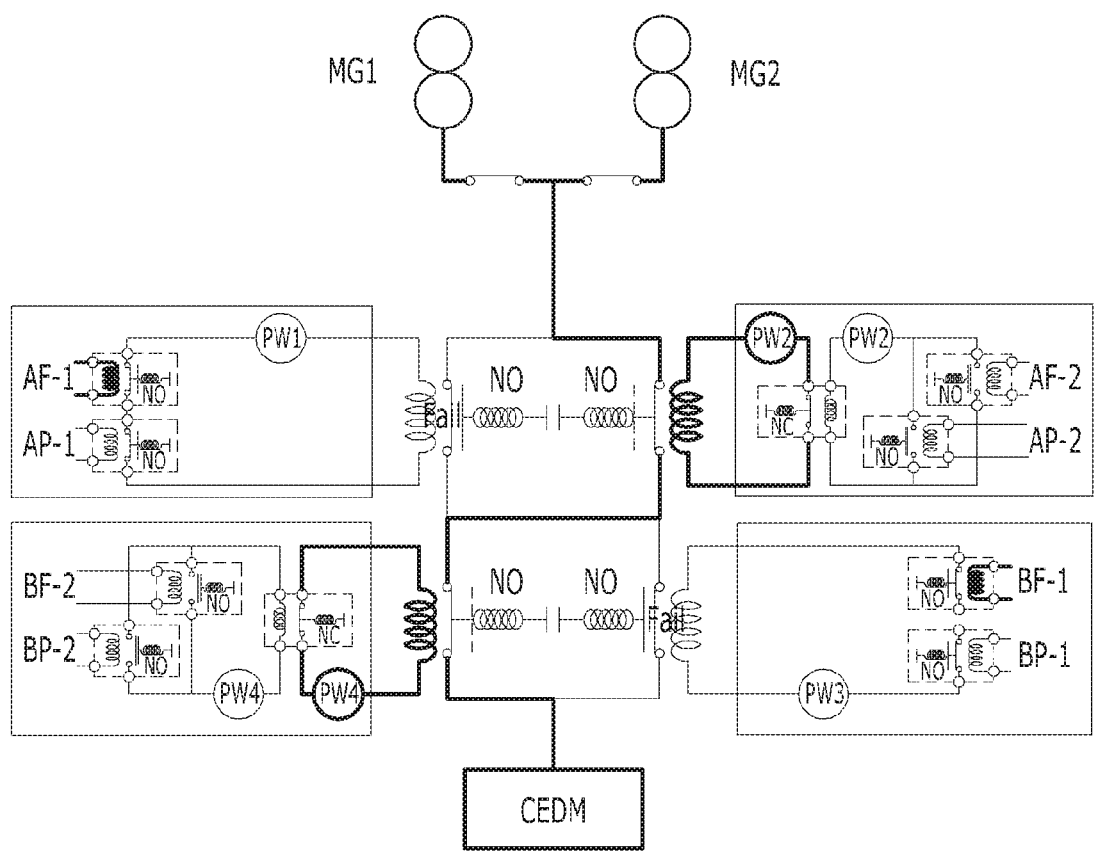
Figure 6F:
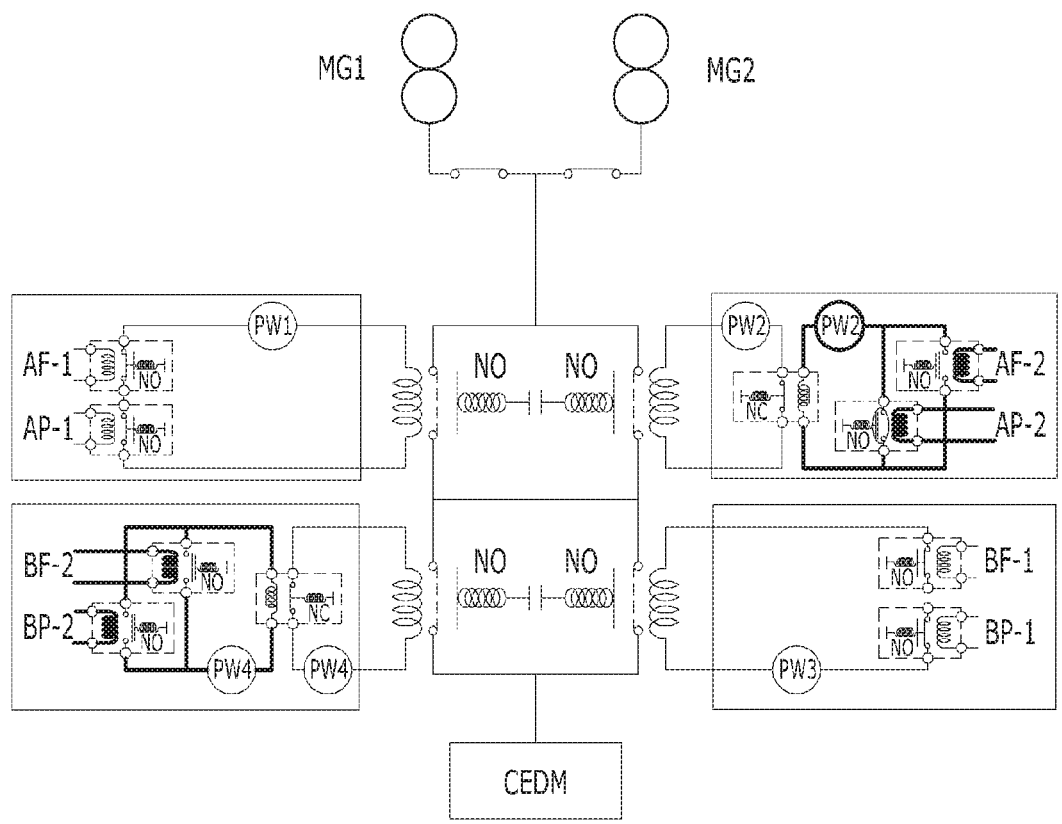
Figure 6G:
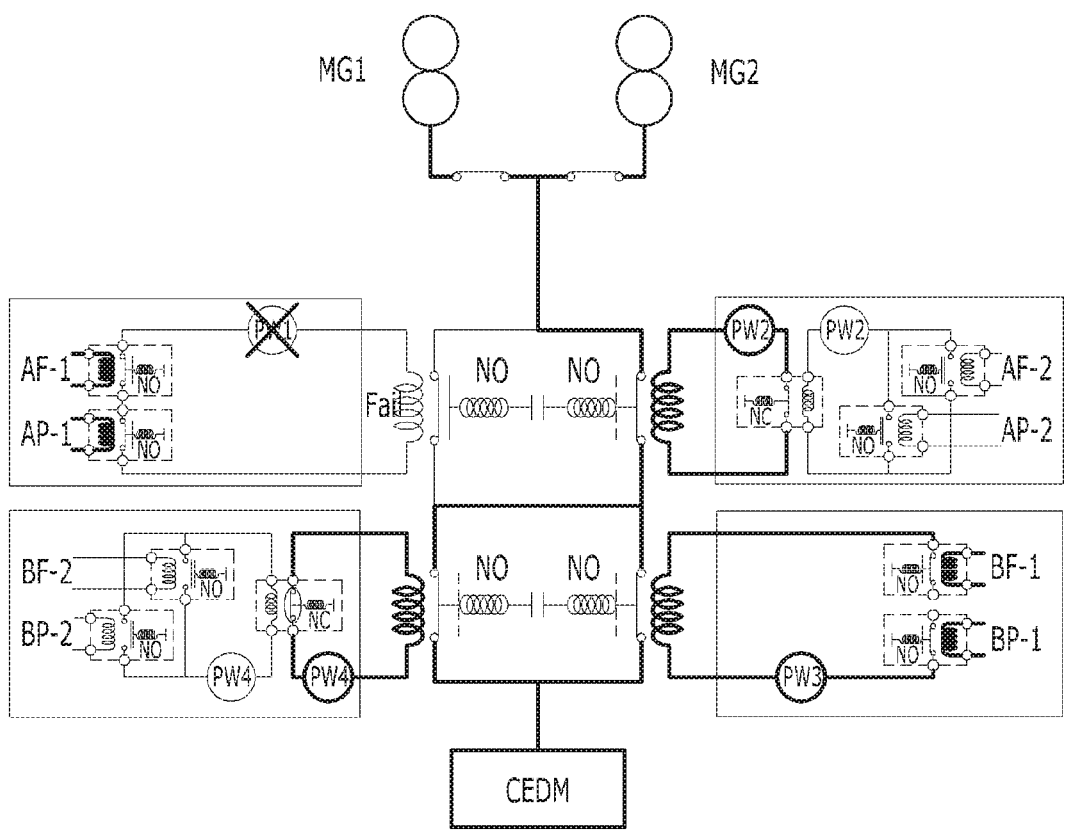
Figure 6H:
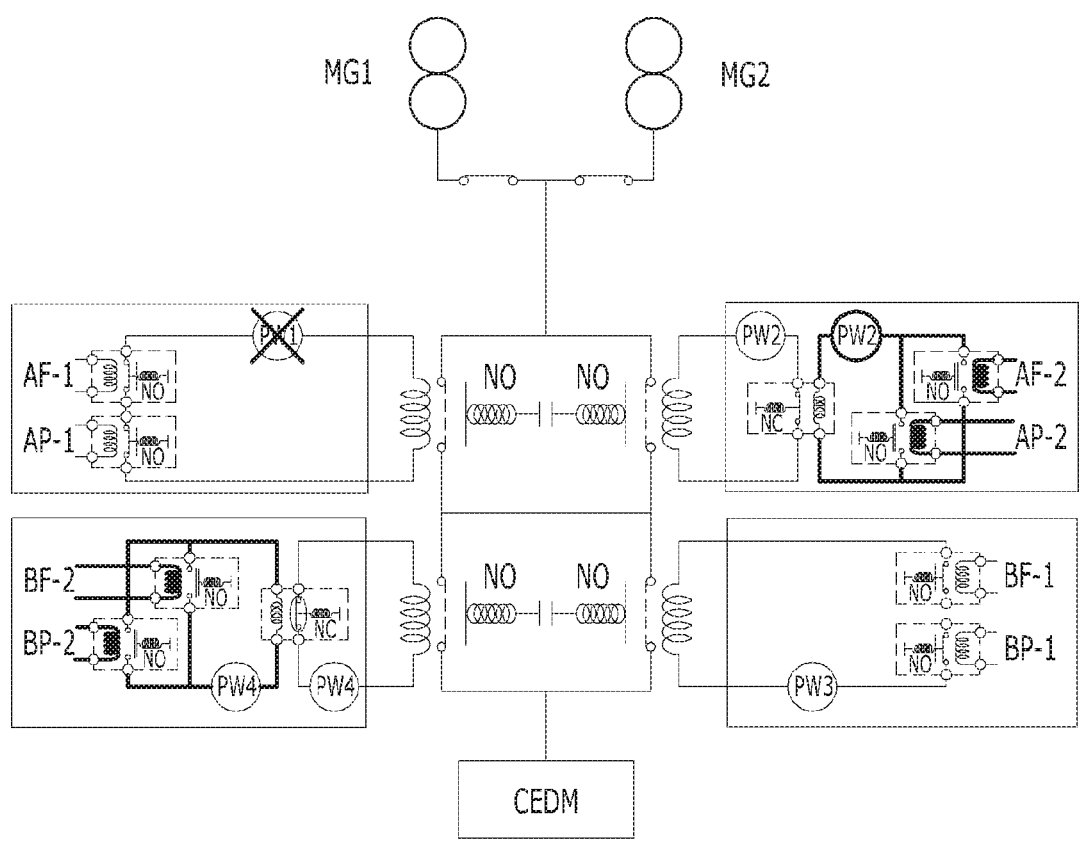
Figure 6I:
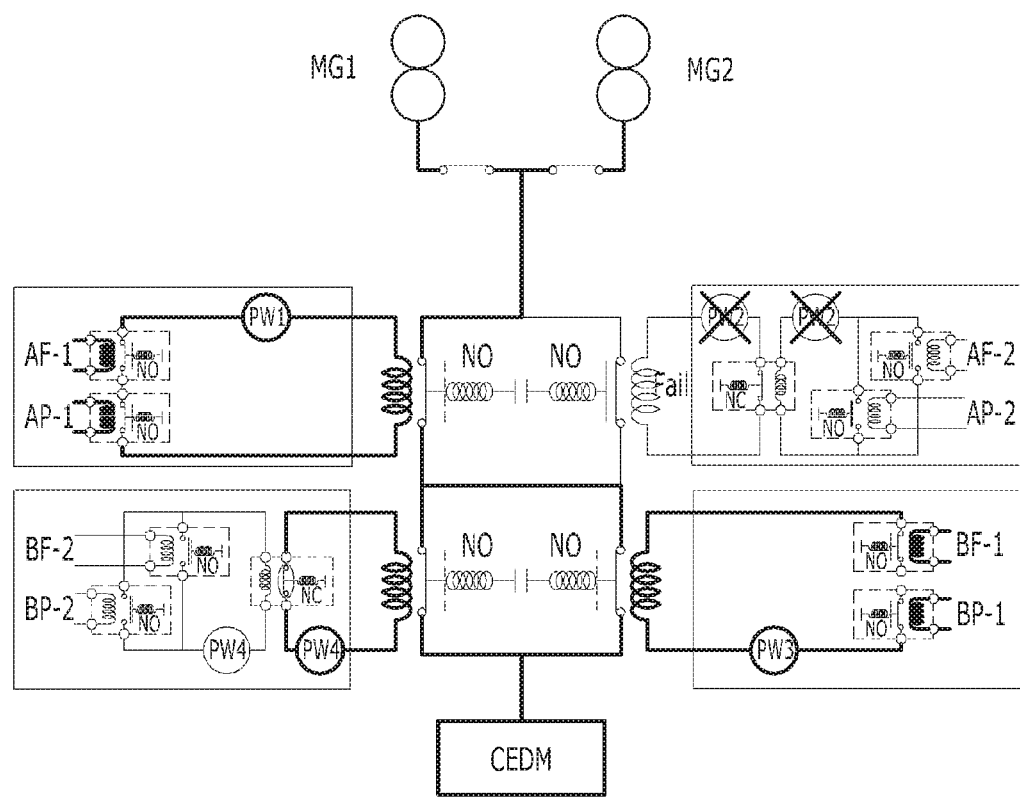
Figure 6J:
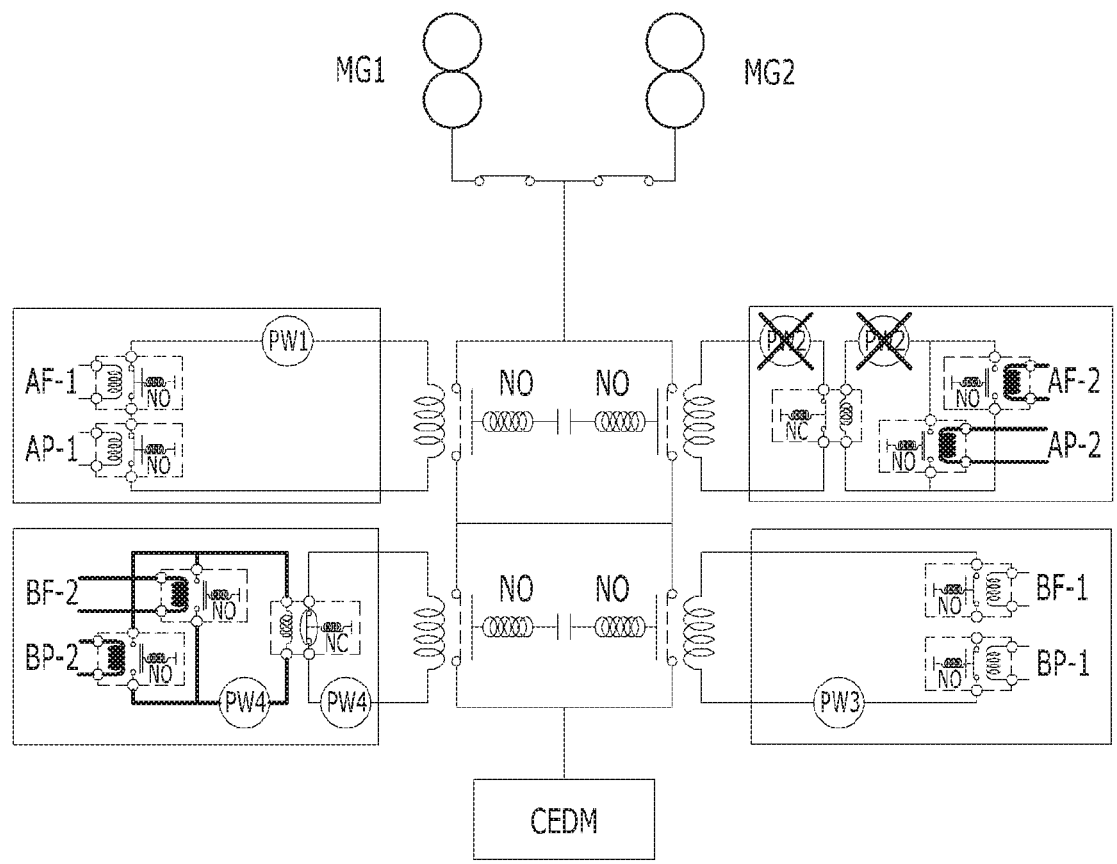
Figure 6K:
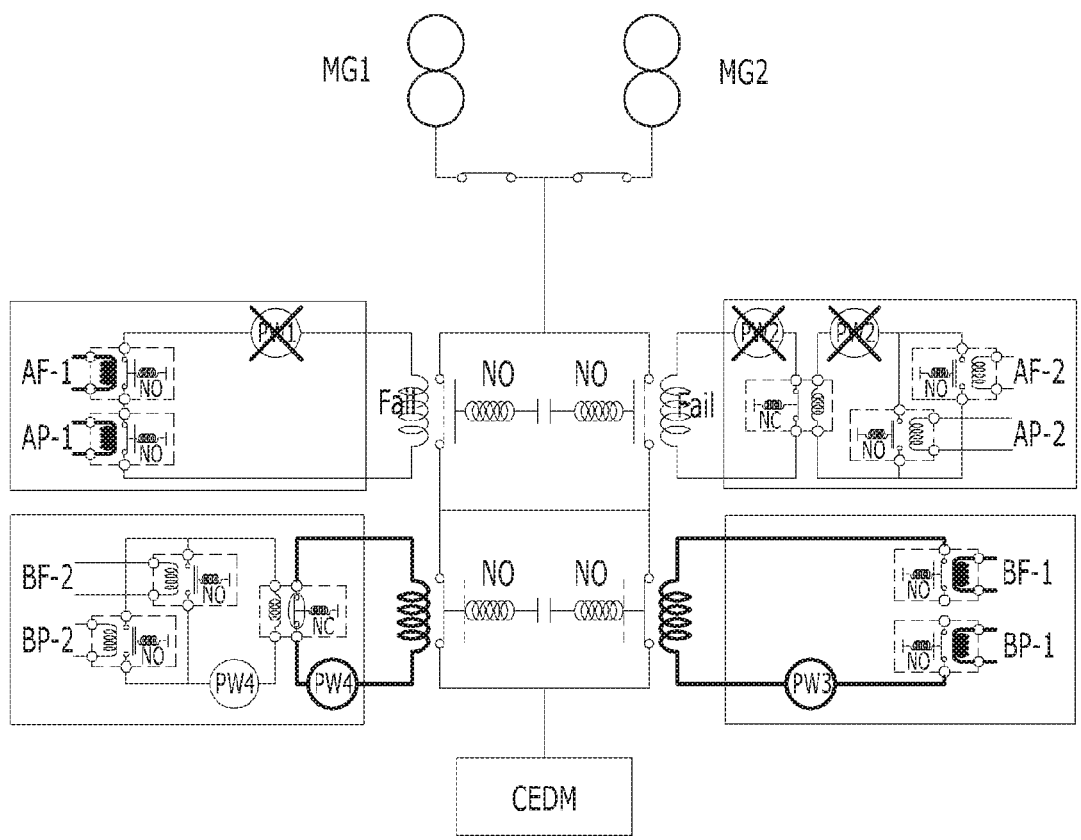
Figure 6L:
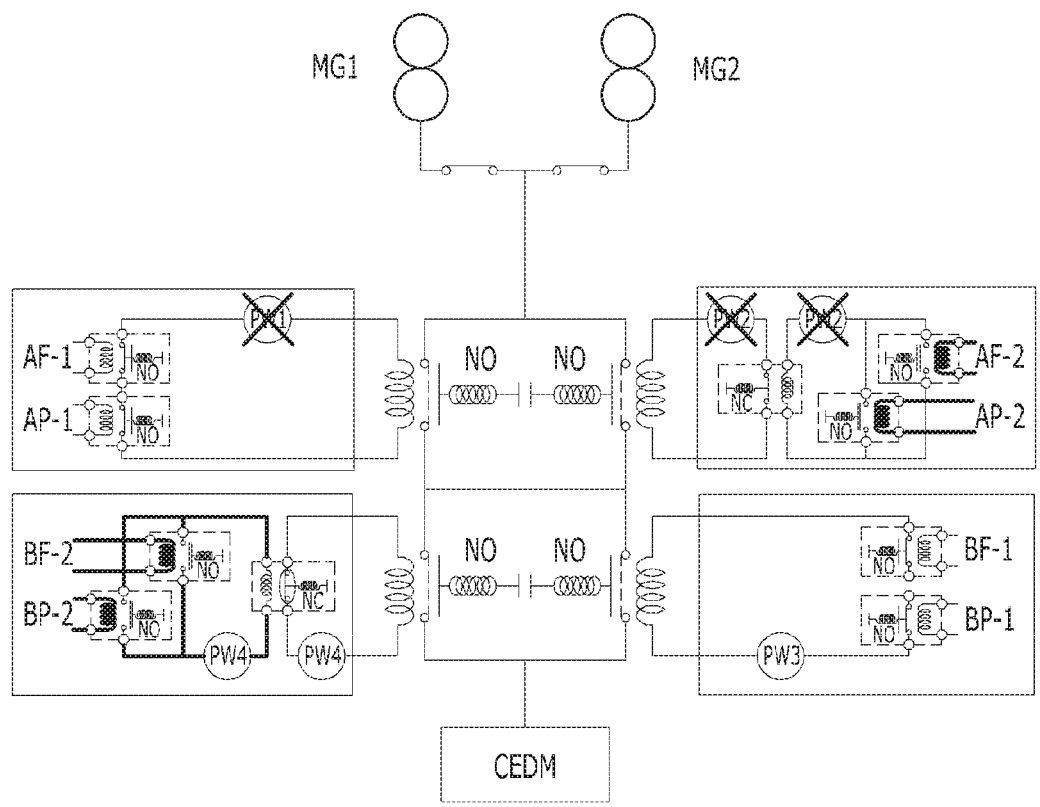
Figure 6M:
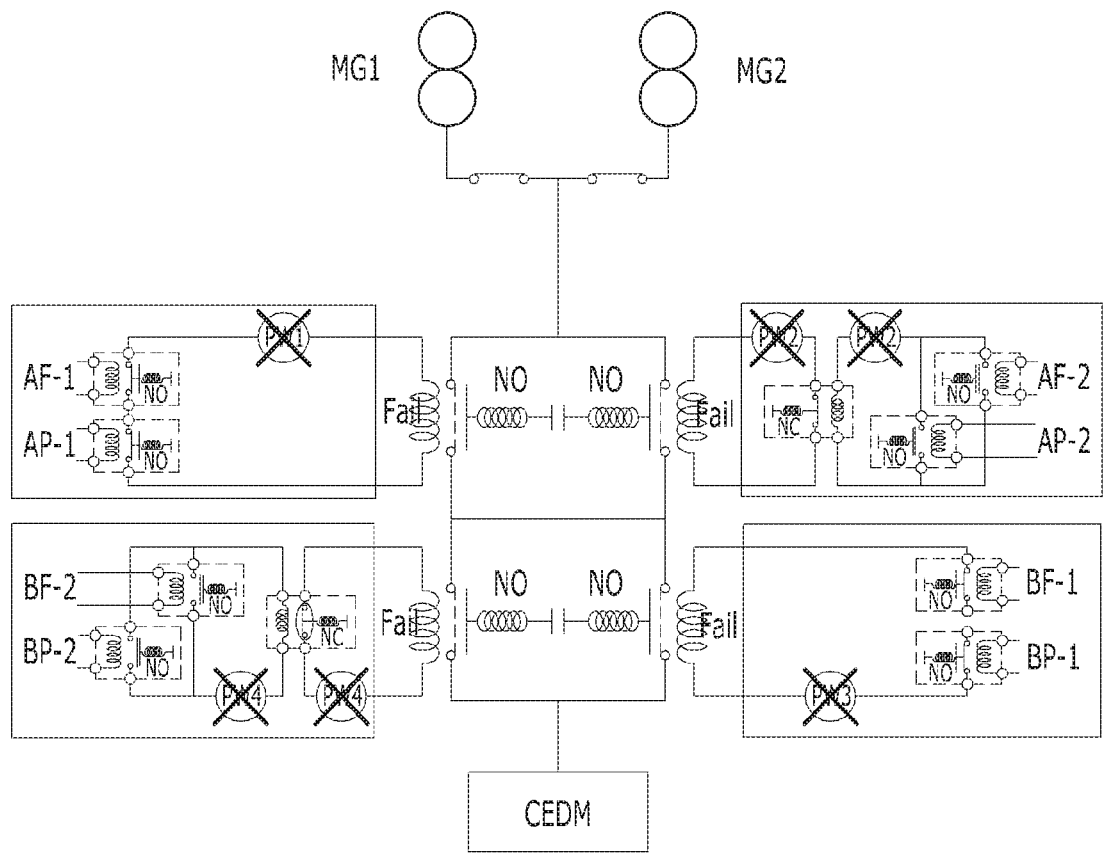
Figure 6N:
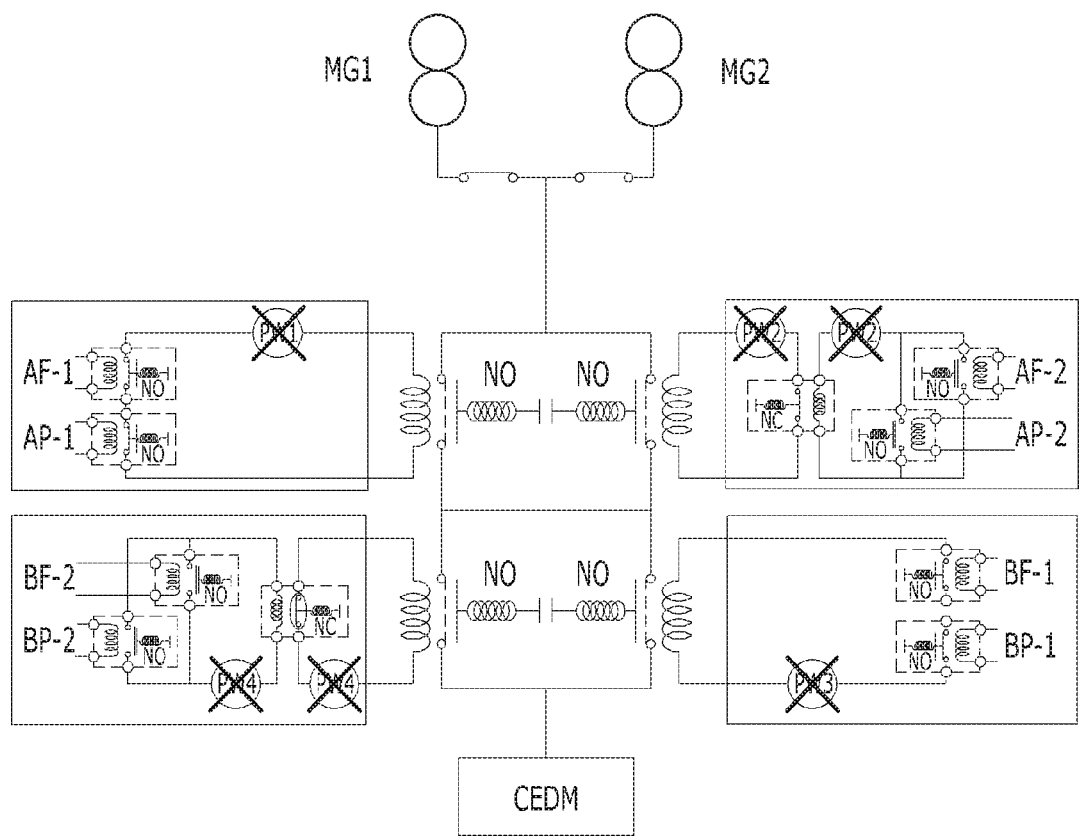

FIGS. 6A to 6N illustrate various exemplary embodiments in which the digital protection system controls to normally operate or stop a rector according to various failure types. Each configuration in FIGS. 6A to 6N is the same as FIG. 5.

FIG. 6A relates to an operation of an initiation circuit according to an exemplary embodiment, wherein a power plant and a protection system thereof are in normal states. When the power plant and the protection system thereof are in normal states, all of the first NO contact point 243 to the fourth NO contact point 246 included in the initiation circuit are maintained in closed states, and power is applied to the CEDM. Therefore, the CEDM does not drop the control element and the reactor normally operates.

FIG. 6B relates to an operation of the initiation circuit according to an exemplary embodiment, wherein the power plant is an abnormal state and the protection system thereof is in a normal state. When the power plant is an abnormal state and the protection system thereof is in a normal state, all of the first NO contact point 243 to the fourth NO contact point 246 included in the initiation circuit are maintained in opened states, and the power is not applied to the CEDM. Therefore, the CEDM drops the control element and the reactor stops operating since the control element is dropped.

FIG. 6C relates to an operation of the initiation circuit according to an exemplary embodiment, wherein the power plant is in a normal state and the protection system thereof is in an abnormal state. When the power plant is in a normal state and the protection system thereof is in an abnormal state, signals AP-2 and BP-2 of the coincidence logic controller based on a PLC of the protection system may show abnormal signals (switching ON) rather than original signals (switching OFF).

Herein, since one of the two relays of the respective first parallel circuit and the second parallel circuit is switched ON, the relays of the third serial circuit and the fourth serial circuit are switched OFF, thus the second NO contact point and the third NO contact point are maintained in opened states. However, since the first NO contact point 243 and the fourth NO contact point 246 which are controlled by the first serial circuit and the second serial circuit are maintained in closed states, the power is normally applied to the CEDM by passing the first NO contact point 243 and the fourth NO contact point 246, thus the reactor normally operates.

FIG. 6D relates to an operation of the initiation circuit according to an exemplary embodiment, wherein the power plant and the protection system thereof are in abnormal states. It corresponds to the worst case scenario wherein the power plant is in an abnormal state and the protection system thereof is also in an abnormal state. Herein, since the power plant is in an abnormal state, the protection system has to drop the control element to stop the reactor, and the protection system may not properly drop the control element as the protection system is also in an abnormal state.

However, the protection system according to an exemplary embodiment may solve the above problem. For example, signals AP-1 and BP-1 of the coincidence logic controllers based on PLC of the protection system may show abnormal signals (switching ON) rather than original signals (switching OFF). Herein, since one of the two relays of the respective first serial circuit 251 and the fourth circuit 256 is switched OFF, the first NO contact point 243 and the fourth NO contact point 246 are maintained in opened states. Since the two relays respectively included in the first parallel circuit 252 and the second parallel circuit are switched ON, the relays respectively included in the third circuit 255 and the fourth circuit 256 are switched OFF. Therefore, the first NO contact point 243, the second NO contact point 244, the third NO contact point 245, and the fourth NO contact point 246 are maintained in opened states, thus the power is not supplied to the CEDM, and the reactor stops operating since the control element is dropped.

FIG. 6E relates to an operation of the initiation circuit according to an exemplary embodiment, wherein the power plant is in a normal state and the protection system thereof is in abnormal state. Signals AP-1 and BP-1 of the coincidence logic controllers based on PLC of the protection system may show abnormal signals (switching OFF) rather than original signals (switching ON).

Herein, since one of the two relays of the respective first serial circuit 251 and the fourth circuit 256 is switched OFF, the first NO contact point 243 and the fourth NO contact point are maintained in opened states. However, the relays respectively included in the third circuit 255 and the fourth circuit 256 which are controlled by the first parallel circuit 252 and the second parallel circuit 253 are maintained switched ON, and the second NO contact point 244 and the third NO contact point 245 are maintained in closed states. Accordingly, the power is normally applied to the CEDM by sequentially passing the second NO contact point 244 and the third NO contact point 245.

FIG. 6F relates to an operation of the initiation circuit according to an exemplary embodiment, wherein the power plant and the protection system thereof are in abnormal states. It corresponds to the worst case scenario wherein the power plant is in an abnormal state and the protection system thereof is also in an abnormal state. Herein, since the power plant is in an abnormal state, the protection system has to drop the control element to stop the reactor, and the protection system may not properly drop the control element as the protection system is also in an abnormal state.

However, the protection system according to an exemplary embodiment may solve the above problem. For example, signals AP-2 and BP-2 of the coincidence logic controllers based on PLC of the protection system may show abnormal signals (switching OFF) rather than original signals (switching ON). Herein, since one of the two relays of the respective first parallel circuit 252 and the second parallel circuit 253 is switched ON, the relays respectively included in third circuit 255 and the fourth circuit 256 are switched OFF. Therefore, the first NO contact point 243, the second NO contact point 244, the third NO contact point 245, and the fourth NO contact point 246 are maintained in opened states, the power is not supplied to the CEDM, and the reactor is stops operating since the control element is dropped.

FIG. 6G relates to an operation of the initiation circuit according to an exemplary embodiment, wherein the power plant and the protections system are in normal states, and first cabinet internal power PW1 included in the first serial circuit 251 is in an abnormal state.

As shown in FIG. 6G: all of the relays included in the first serial circuit 251 are switched ON, and the first NO contact point 243 becomes an opened state since current is not supplied from the first cabinet internal power PW1; all of the relays included in the first parallel circuit 252 are switched OFF, and the relay included in the third circuit 255 is switched ON. Accordingly, the second NO contact point 244 becomes a closed state.

In addition, all of the relays included in the second parallel circuit 253 are switched OFF, and the relay included in the fourth circuit 256 is switched ON. Accordingly, the third NO contact point 245 becomes a closed state.

In addition, all of the relays included in the second serial circuit 254 are switched ON, and the fourth NO contact point 246 becomes a closed state.

The power is thus normally applied to the CEDM by sequentially passing the second NO contact point 244, and the third NO contact point 245 or the fourth NO contact point 246. Therefore, the reactor normally operates.

FIG. 6H relates to an operation of the initiation circuit according to an exemplary embodiment, wherein the power plant is in an abnormal state, the protections system is in a normal state, and the first cabinet internal power PW1 included in the first serial circuit 251 is in an abnormal state.

As shown in FIG. 6H:

all of the relays included in the first serial circuit 251 are switched OFF, and the first NO contact point 243 becomes an opened state since current is not supplied from the first cabinet internal power PW1; and all of the relays included in the first parallel circuit 252 are switched ON, and the relay included in the third circuit 255 is switched OFF. Accordingly, the second NO contact point 244 becomes an opened state.

In addition, all of the relays included in the second parallel circuit 253 are switched ON, and the relay included in fourth circuit 256 are switched OFF. Accordingly, the third NO contact point 245 becomes an opened state.

In addition, all of the relays included in the second serial circuit 254 are switched OFF, and the fourth NO contact point 246 becomes an opened state.

The power is thus not supplied to the CEDM, and the reactor stops operating since the control element is dropped.

FIG. 6I relates to an operation of the initiation circuit according to an exemplary embodiment, wherein the power plant and the protections system are in normal states, and all of second cabinet internal powers PW2 included in the first parallel circuit 252 and the third circuit 255 are in abnormal states.

As shown in FIG. 6I: all of the relays included in the first serial circuit 251 are switched ON, and the first NO contact point 243 becomes a closed state; and all of the relays included in the first parallel circuit 252 are switched OFF, and the relay included in the third circuit 255 is switched ON. However, the second NO contact point 244 becomes an opened state since current is not supplied from the second cabinet internal power PW2 included in the third circuit 255.

In addition, all of the relays included in the second parallel circuit 253 are switched OFF, the relay included in the fourth circuit 256 is switched ON. Accordingly, the third NO contact point 245 becomes a closed state.

In addition, all of the relays included in the second serial circuit 254 are switched ON, and the fourth NO contact point 246 becomes a closed state.

The power is thus normally applied to the CEDM by sequentially passing the first NO contact point 243 and the third NO contact point 245 or the fourth NO contact point 246. Thus, the reactor normally operates.

FIG. 6J relates to an operation of the initiation circuit according to an exemplary embodiment, wherein the power plant is in a normal state, the protections system is in a abnormal state, and all of the second cabinet internal powers PW2 included in the first parallel circuit 252 and the third circuit 255 are in abnormal states.

As shown in FIG. 6J: all of the relays included in the first serial circuit 251 are switched OFF, and the first NO contact point 243 becomes an opened state; and all of the relays included in the first parallel circuit 252 are switched ON, and the relay included in the third circuit 255 is switched ON since current is not supplied from the second cabinet internal power PW2. However, the second NO contact point 244 becomes an opened state since current is not supplied from the second cabinet internal power PW2 included in the third circuit 255.

In addition, all of the relays included in the second parallel circuit 253 are switched ON, and the relay included in the fourth circuit 256 is switched OFF. Accordingly, the third NO contact point 245 becomes an opened state.

In addition, all of the relays included in the second serial circuit 254 are switched OFF, and the fourth NO contact point 246 becomes an opened state.

The power is thus not supplied to the CEDM, and the reactor stops operating since the control element is dropped.

FIG. 6K relates to an operation of the initiation circuit according to an exemplary embodiment, wherein the power plant and the protections system are in normal states, and all of the first cabinet internal power PW1 included in first serial circuit 251, and the second cabinet internal powers PW2 included in the first parallel circuit 252 and the third circuit 255 are in abnormal states.

As shown in FIG. 6K: all of the relays included in the first serial circuit 251 are switched ON, and the first NO contact point 243 becomes an opened state since current is not supplied from the first cabinet internal power PW1; and all of the relays included in the first parallel circuit 252 are switched OFF, and the relay included in the third circuit 255 is switched ON. However, the second NO contact point 244 becomes an opened state since current is not supplied from the second cabinet internal power PW2 included in the third circuit 255.

In addition, all of the relays included in the second parallel circuit 253 are switched OFF, and the relay included in the fourth circuit 256 is switched ON. Accordingly, the third NO contact point 245 becomes a closed state.

In addition, all of the relays included in the second serial circuit 254 are switched ON, and the fourth NO contact point 246 becomes a closed state.

The power is thus not supplied to the CEDM, and the reactor stops operating since the control element is dropped.

FIG. 6L relates to an operation of the initiation circuit according to an exemplary embodiment, wherein the power plant is in an abnormal state, the protections system is in a normal state, and all of the first cabinet internal power PW1 included in first serial circuit 251, and the second cabinet internal powers PW2 included in the first parallel circuit 252 and the third circuit 255 are in abnormal states.

As shown in FIG. 6L: all of the relays included in the first serial circuit 251 are switched OFF, and the first NO contact point 243 becomes an opened state since current is not supplied from the first cabinet internal power PW1; and all of the relays included in the first parallel circuit 252 are switched ON, and the relay included in the third circuit 255 is switched ON since current is not supplied from the second cabinet internal power PW2. However, the second NO contact point 244 becomes an opened state since current is not supplied to the second cabinet internal power PW2 included in the third circuit 255.

In addition, all of the relays included in the second parallel circuit 253 are switched ON, and the relay included in the fourth circuit 256 is switched OFF. Accordingly, the third NO contact point 245 becomes an opened state.

In addition, all of the relays included in the second serial circuit 254 are switched OFF, and the fourth NO contact point 246 becomes an opened state.

The power is thus not supplied to the CEDM, and the reactor stops operating since the control element is dropped.

FIG. 6M relates to an operation of the initiation circuit according to an exemplary embodiment, wherein the power plant and the protection system are in normal states, and all of the first cabinet internal power PW1 included in first serial circuit 251, the second cabinet internal powers PW2 included in the first parallel circuit 252 and the third circuit 255, third cabinet internal power PW3 included in the second serial circuit 254, and fourth cabinet internal powers PW4 included in the second parallel circuit 253 and the fourth circuit 256 are in abnormal states.

As shown in FIG. 6M: all of the relays included in the first serial circuit 251 are switched ON, and the first NO contact point 243 becomes an opened state since current is not supplied from the first cabinet internal power PW1; and all of the relays included in the first parallel circuit 252 are switched OFF, and the relay included in the third circuit 255 is switched ON. However, the second NO contact point 244243 becomes an opened state since current is not supplied from the second cabinet internal power PW2.

In addition, all of the relays included in the second parallel circuit 253 are switched OFF, and the relay included in the fourth circuit 256 is switched ON. However, the third NO contact point 245 becomes an opened state since current is not supplied from the third cabinet internal power PW3.

In addition, all of the relays included in the second serial circuit 254 are switched ON, and the fourth NO contact point 246 becomes an opened state since current is not supplied from the fourth cabinet internal power PW4.

The power is thus not supplied to the CEDM, and the reactor stops operating since the control element is dropped.

FIG. 6N relates to an operation of the initiation circuit according to an exemplary embodiment, wherein the power plant is in an abnormal state, the protections system is in a normal state, and all of the first cabinet internal power PW1 included in first serial circuit 251, the second cabinet internal powers PW2 included in the first parallel circuit 252 and the third circuit 255, the third cabinet internal power PW3 included in the second serial circuit 254, and the fourth cabinet internal power PW4 included in the second parallel circuit 253 and the fourth circuit 256 are in abnormal states.

As shown in FIG. 6N: all of the relays included in the first serial circuit 251 are switched OFF, and the first NO contact point 243 becomes an opened state since current is not supplied from the first cabinet internal power PW1; and all of the relays included in the first parallel circuit 252 are switched ON, and the relay included in the third circuit 255 is switched ON since current is not supplied from the second cabinet internal power PW2. However, the second NO contact point 244 becomes an opened state since current is not supplied from the second cabinet internal power PW2 included in the third circuit 255.

In addition, all of the relays included in the second parallel circuit 253 are switched ON, and the relay included in the fourth circuit 256 is switched ON since current is not supplied from the third cabinet internal power PW3. Accordingly, the third NO contact point 245 becomes an opened state.

In addition, all of the relays included in the second serial circuit 254 are switched OFF, and the first NO contact point 243 becomes an opened state since current is not supplied from the fourth cabinet internal power PW4.

The power is thus not supplied to the CEDM, and the reactor stops operating since the control element is dropped.

Referring to FIGS. 6A to 6N, in an emergency situation wherein a control element dropping signal has to be generated, the digital protection system according to the exemplary embodiments controls the CEDM through mutual supplementation between remaining relays and contact points even though any one of the protection systems becomes in an abnormal state. Thus, the reactor may normally operate or stop operating since the protection system of the nuclear power plant normally operates in an event of SPV or CCF.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A digital protection system comprising:
   a process protection system comprising at least two channels, each of the at least two channels comprising a first bistable logic controller and a second bistable logic controller which is independent and of a different type from the first bistable logic controller, the first bistable logic controller and the second bistable logic controller receiving a process parameter and respectively outputting first and second bistable logic results based on the process parameter, the first bistable logic result comprising one of a first normal signal and a first abnormal signal; and
   a reactor protection system comprising at least two trains, at least two initiation circuits, and a parallel circuit that includes a plurality of relays connected in parallel,
   wherein each of the at least two initiation circuits comprises a serial circuit in which a plurality of relays are serially connected,
   wherein each of the two trains comprises a first coincidence logic controller and a second coincidence logic controller which is independent and of a different type from the first coincidence logic controller, the first coincidence logic controller and the second coincidence logic controller respectively outputting first and second coincidence logic results based on the first and second bistable logic results, the first coincidence logic controller receiving the first bistable logic result from the first bistable logic controller included in each of the at least two channels and outputting the first coincidence logic result based on a count of the first bistable logic result and a count of the first abnormal signal, wherein the plurality of relays included in the serial circuit are switched on or off based on the first and second bistable logic results, and the plurality of relays included in the parallel circuit are switched on or off based on the first and second coincidence logic results, and wherein the first coincidence logic result comprises a first output signal and a second output signal that is different from the first output signal, the first output signal being input to a first relay of the plurality of relays included in the serial circuit, the second output signal being input to a first relay of the plurality of relays included in the parallel circuit.

2. The digital protection system of claim 1, wherein the process protection system comprises a first channel, a second channel, a third channel, and a fourth channel.

3. The digital protection system of claim 1, wherein the reactor protection system comprises a first train and a second train.

4. The digital protection system of claim 1, wherein the process protection system comprises a first bistable logic controller based on a field programmable gate array (FPGA), and a second bistable logic controller based on a programmable logic controller (PLC).

5. The digital protection system of claim 1, wherein each of the first and the second bistable logic controllers transmits the first and second bistable logic results to all coincidence logic controllers that have a same type of a logic structure.

6. The digital protection system of claim 1, wherein the process parameter comprises at least one of temperature information about a high temperature pipe and a low temperature pipe of a reactor coolant, pressurizer pressure information, pressurizer water level information, neutron flux information, reactor coolant flow rate information, containment building pressure information, steam generator water level information, steam pipe pressure information, and refueling water tank water level information.

7. The digital protection system of claim 1,
wherein the second coincidence logic controller receives the second bistable logic result comprising one of a second normal signal and a second abnormal signal from the second bistable logic controller included in each of the at least two channels and outputs the second coincidence logic result based on a count of the second bistable logic result and a count of the second abnormal signals, and wherein the second coincidence logic result comprises a third output signal and a fourth output signal that is different from the third output signal, the third output signal being input to a second relay of the plurality of relays included in the serial circuit, the fourth output signal being input to a second relay of the plurality of relays included in the parallel circuit.

8. The digital protection system of claim 7,
wherein the first coincidence logic controller outputs the first coincidence logic result in response to the first bistable logic result comprising at least one abnormal signal, the first coincidence logic result being a logic "0" input to the first relay of the plurality of relays included in the serial circuit and being a logic "1" input to the first relay of the plurality of relays included in the parallel circuit, and wherein the second coincidence logic controller outputs the second coincidence logic result in response to the second bistable logic result comprising at least one abnormal signal, the second coincidence logic result being a logic "0" input to the second relay of the plurality of relays included in the serial circuit and being a logic "1" input to the second relay of the plurality of relays included in the parallel circuit.

9. The digital protection system of claim 7,
wherein the first coincidence logic controller outputs a coincidence logic result in response to the first and second bistable logic results comprising at least one normal signal, the coincidence logic result being a logic "1" input to the first relay of the plurality of relays included in the serial circuit and being a logic "0" input to the first relay of the plurality of relays included in the parallel circuit, and wherein the second coincidence logic controller outputs a coincidence logic result in response to the first and second bistable logic results comprising at least one normal signal, the coincidence logic result being a logic "1" input to the second relay of the plurality of relays included in the serial circuit and being a logic "0" input to the second relay of the plurality of relays included in the parallel circuit.

10. The digital protection system of claim 1, further comprising an reactor trip switchgear system (RTSS), wherein the RTSS comprises:
a first normally open (NO) contact point disposed between a power node and a central node;
a second NO contact point disposed between the power node and the central node;
a third NO contact point disposed between the central node and a control element drive mechanism (CEDM); and
a fourth NO contact point disposed between the central node and the CEDM.

11. The digital protection system of claim 10, wherein when at least one of the first NO contact point and the second NO contact point is in a closed state and at least one of the third NO contact point and the fourth NO contact point is in a closed state, motor-generator set (MG-SET) power is applied to the CEDM.

12. The digital protection system of claim 10, wherein when both of the first NO contact point and the second NO contact point are in opened states and both of the third NO contact point and the fourth NO contact point are in opened states, MG-SET power applied to the CEDM is shut down.

13. The digital protection system of claim 10, wherein at least one of the at least two initiation circuits comprises:
a first serial circuit configured to control a conduction state of the first NO contact point according to output signals of the coincidence logic controller;
a first parallel circuit configured to control a conduction state of the second NO contact point according to output signals of the coincidence logic controller;
a second parallel circuit configured to control a conduction state of the third NO contact point according to output signals of the coincidence logic controller; and
a second serial circuit configured to control a conduction state of the fourth NO contact point according to output signals of the coincidence logic controller.

14. The digital protection system of claim 13, wherein the first serial circuit and the first parallel circuit receive output signals from the first coincidence logic controller and the second coincidence logic controller that has a same logic structure as the first coincidence logic controller and included in any one of the at least two trains.

15. The digital protection system of claim 14, wherein the second parallel circuit and second serial circuit receive output signals from the first coincidence logic controller and the second coincidence logic controller that has a same logic structure as the first coincidence logic controller and included another train of the at least two trains.

16. The digital protection system of claim 13, wherein at least one of the at least two initiation circuits comprises:
- a third circuit that comprises a relay and is configured to switch on or off the relay included in the third circuit to control the conduction state of the second NO contact point; and
- a fourth circuit that comprises a relay and is configured to switch on or off the relay included in the fourth circuit to control the conduction state of the third NO contact point,
- wherein the first parallel circuit controls to switch on or off the relay included in the third circuit, and the second parallel circuit controls to switch on or off the relay included in the fourth circuit.

17. The digital protection system of claim 16, wherein the relays included in the third circuit and the fourth circuit are normally-closed (NC) contact points.

18. The digital protection system of claim 16, wherein
- the first serial circuit or the second serial circuit comprises two relays that are serially connected, and the two relays are switched on or off according to output signals of the coincidence logic controller, and
- when all relays are switched on, the first NO contact point or the fourth NO contact point is closed, or when at least one of the two relays is switched off, the first NO contact point or the fourth NO contact point is opened.

19. The digital protection system of claim 16, wherein
- the first parallel circuit or the second parallel circuit comprises two relays that are connected in parallel,
- the two relays are switched on or off according to output signals of the coincidence logic controller, and
- when all relays included in the first parallel circuit or the second parallel circuit are switched off, the relay included in the third circuit or the fourth circuit is switched on, or when at least one of the two relays included in the first parallel circuit or the second parallel circuit is switched on, the relay included in the third circuit or the fourth circuit is switched off.

* * * * *